(12) United States Patent
Ikeda et al.

(10) Patent No.: US 9,995,978 B2
(45) Date of Patent: Jun. 12, 2018

(54) DISPLAY DEVICE

(71) Applicant: Japan Display Inc., Minato-ku (JP)

(72) Inventors: Daisuke Ikeda, Tokyo (JP); Atsuhiro Katayama, Tokyo (JP); Yasuhiro Kanaya, Tokyo (JP)

(73) Assignee: Japan Display Inc., Minato-ku (JP)

( * ) Notice: Subject to any disclaimer, the term of this patent is extended or adjusted under 35 U.S.C. 154(b) by 127 days.

(21) Appl. No.: 15/088,854

(22) Filed: Apr. 1, 2016

(65) Prior Publication Data
US 2016/0306214 A1    Oct. 20, 2016

(30) Foreign Application Priority Data

Apr. 20, 2015  (JP) ................. 2015-086048

(51) Int. Cl.
*G02F 1/1333* (2006.01)
*G02F 1/1345* (2006.01)
*G02F 1/13* (2006.01)
*G02F 1/1362* (2006.01)

(52) U.S. Cl.
CPC ........ *G02F 1/13458* (2013.01); *G02F 1/1345* (2013.01); *G02F 1/13452* (2013.01); *G02F 1/136259* (2013.01); *G02F 1/136286* (2013.01); *G02F 2001/13456* (2013.01)

(58) Field of Classification Search
CPC ....... G02F 2001/13456; G02F 1/13458; G02F 1/1345; G02F 1/13452
See application file for complete search history.

(56) References Cited

U.S. PATENT DOCUMENTS

| 6,038,003 A * | 3/2000 | Kim | .............. G02F 1/1345 349/122 |
| 2014/0029228 A1* | 1/2014 | Yamaguchi | .............. H05K 7/02 361/784 |

FOREIGN PATENT DOCUMENTS

JP    2003-172945    6/2003

* cited by examiner

*Primary Examiner* — Wen-Ying P Chen
(74) *Attorney, Agent, or Firm* — Oblon, McClelland, Maier & Neustadt, L.L.P.

(57) ABSTRACT

To improve the reliability of a display device.

The display device includes a display portion, an input unit, and a lead-out wiring portion which connects the display portion and the input unit to each other. In addition, the input unit includes a first terminal group in which a plurality of first terminals are arranged. In addition, the lead-out wiring portion includes a plurality of first lead-out wirings connected to the plurality of first terminals. In addition, a first end-portion wiring, which is formed in an end portion of an array, among the plurality of first lead-out wirings, includes a first main line which extends along an extending direction of a neighboring first lead-out wiring, a first bypass line which extends along the first main line, and a first branch portion and a second branch portion which connect the first main line and the first bypass line to each other.

15 Claims, 16 Drawing Sheets

DISPLAY DEVICE

CROSS-REFERENCE TO RELATED APPLICATION

The present application claims priority from Japanese Patent Application No. 2015-086048 filed on Apr. 20, 2015, the content of which is hereby incorporated by reference into this application.

TECHNICAL FIELD OF THE INVENTION

The present invention relates to a display device, and, for example, relates to an effective technique when applied to a display device which has a plurality of lead-out wirings to transmit a signal to a plurality of display elements formed in a display area.

BACKGROUND OF THE INVENTION

There is a display device which transmits a signal to a plurality of display elements formed in a display area via a plurality of lead-out wirings to display an image.

For example, Japanese Patent Application Laid-Open Publication No. 2003-172945 (Patent Document 1) describes a display device in which a plurality of dummy wirings, which are not connected to signal lines, are arranged next to signal wirings.

SUMMARY OF THE INVENTION

A display device includes a display function layer, for example, a liquid crystal layer, a light emitting layer which uses electroluminescence, or the like. In addition, the display device includes a plurality of display pixels having a transistor formed in a display area, or the like. An image is displayed in the display device by transmitting a signal to the plurality of display pixels and driving the display pixels. A number of signal lines are necessary to transmit the signal to the plurality of display pixels. Recently, there is a tendency that the number of signal lines increases, as definition of a display image becomes higher, and as a result, a wiring pattern of the signal lines becomes finer.

According to a study of the inventors of the present application, it has been found out that damage on a part of the wiring pattern is easily generated, as the wiring pattern configuring a signal transmission path becomes finer. In addition, it has been found out that a main cause of such damage of the wiring pattern is a discharge phenomenon called electro-static discharge (ESD). Thus, the inventors of the present application have conducted a study regarding a technique which suppresses disconnection of the signal transmission path to improve reliability of the display device, even when the ESD is generated.

An object of the present invention is to provide a technique that improves the reliability of the display device.

A display device as one aspect of the present invention includes a display portion, an input unit, and a lead-out wiring portion which connects the display portion and the input unit to each other. In addition, the input unit includes a first terminal group in which a plurality of first terminals are arranged. In addition, the lead-out wiring portion includes a plurality of first lead-out wirings connected to the plurality of first terminals. In addition, a first end-portion wiring, which is formed in an end portion of an array, among the plurality of first lead-out wirings, includes a first main line which extends along an extending direction of a neighboring first lead-out wiring, a first bypass line which extends along the first main line, and a first branch portion and a second branch portion which connect the first main line and the first bypass line to each other.

Further, a display device as another aspect of the present invention includes a substrate provided with a first surface. The first surface includes a display portion, an input unit, and a lead-out wiring portion which connects the display portion and the input unit to each other. In addition, the input unit includes a first terminal group in which a plurality of first terminals are arranged, and a second terminal group which is provided to be spaced apart from the first terminal group and in which a plurality of second terminals are arranged. In addition, the lead-out wiring portion includes a plurality of first lead-out wirings connected to the plurality of first terminals, and a plurality of second lead-out wirings connected to the plurality of second terminals. In addition, a first end-portion wiring, formed in an end portion of an array on a side distant from the second terminal group, among the plurality of first lead-out wirings, includes a first main line which extends along an extending direction of a neighboring first lead-out wiring, a first bypass line which extends along the first main line, and a first branch portion and a second branch portion which connect the first main line and the first bypass line to each other. In addition, a second end-portion wiring, formed in an end portion of the array on a side distant from the first terminal group, among the plurality of second lead-out wirings, includes a second main line which extends along an extending direction of a neighboring second lead-out wiring, a second bypass line which extends along the second main line, and a third branch portion and a fourth branch portion which connect the second main line and the second bypass line to each other.

BRIEF DESCRIPTIONS OF THE DRAWINGS

DESCRIPTIONS OF THE PREFERRED EMBODIMENTS

Figure 1:
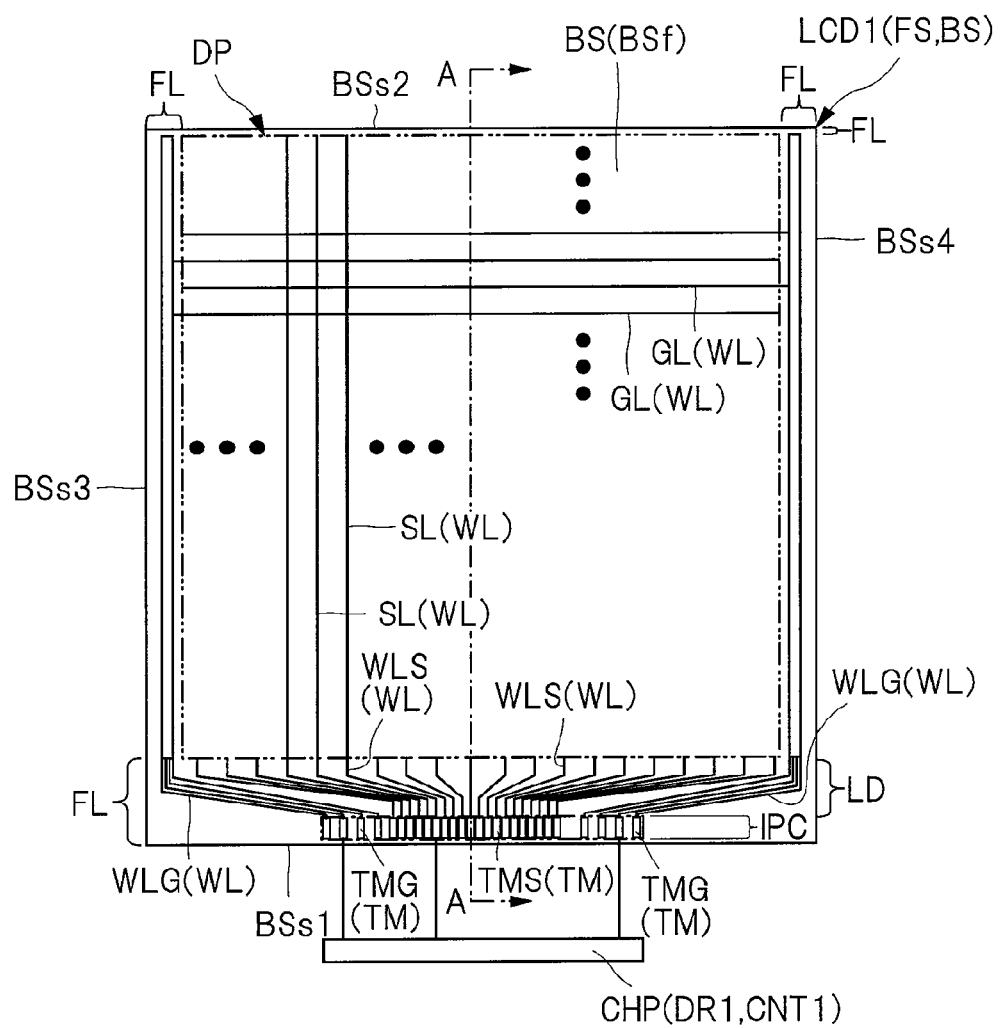
FIG. 1 is a plan view illustrating an example of a display device of an embodiment.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention. Further, in the specification and drawings, elements which are similar to those already mentioned with respect to previous drawings are denoted by the same reference characters, and detailed descriptions thereof will be suitably omitted.

Moreover, a technique to be described in the following embodiments is widely applicable to a display device having a mechanism in which signals are supplied to a plurality of display pixels in a display region on which a display functional layer is formed from the periphery of the display region. The above-mentioned display device is exemplified by various display devices, such as, a liquid crystal display device and an organic EL (Electro-Luminescence) display device. In the following embodiments, descriptions will be given to the liquid crystal display device as a representative example of display devices.

The liquid crystal display device is also broadly classified into two categories to be described below, depending on an application direction of an electric field for changing an orientation of liquid crystal molecules in the liquid crystal layer serving as a display functional layer. More specifically, the first category is a so-called vertical electric field mode in which an electric field is applied in a thickness direction (or an out-of-plane direction) of the display device. Examples of the vertical electric field mode include a Twisted Nematic (TN) mode and a Vertical Alignment (VA) mode. The second category is a so-called horizontal electric field mode in which an electric field is applied in a planar direction (or an in-plane direction) of the display device. Examples of the horizontal electric field mode include an In-Plane Switching (IPS) mode, and a Fringe Field Switching (FFS) mode as one type of the IPS modes. While a technique described below is applicable to both the vertical electric field mode and the horizontal electric field mode. However, a display device in the horizontal electric field mode will be described as an example in the present embodiment.

First Embodiment

<Basic Configuration of Display Device>

Figure 2:
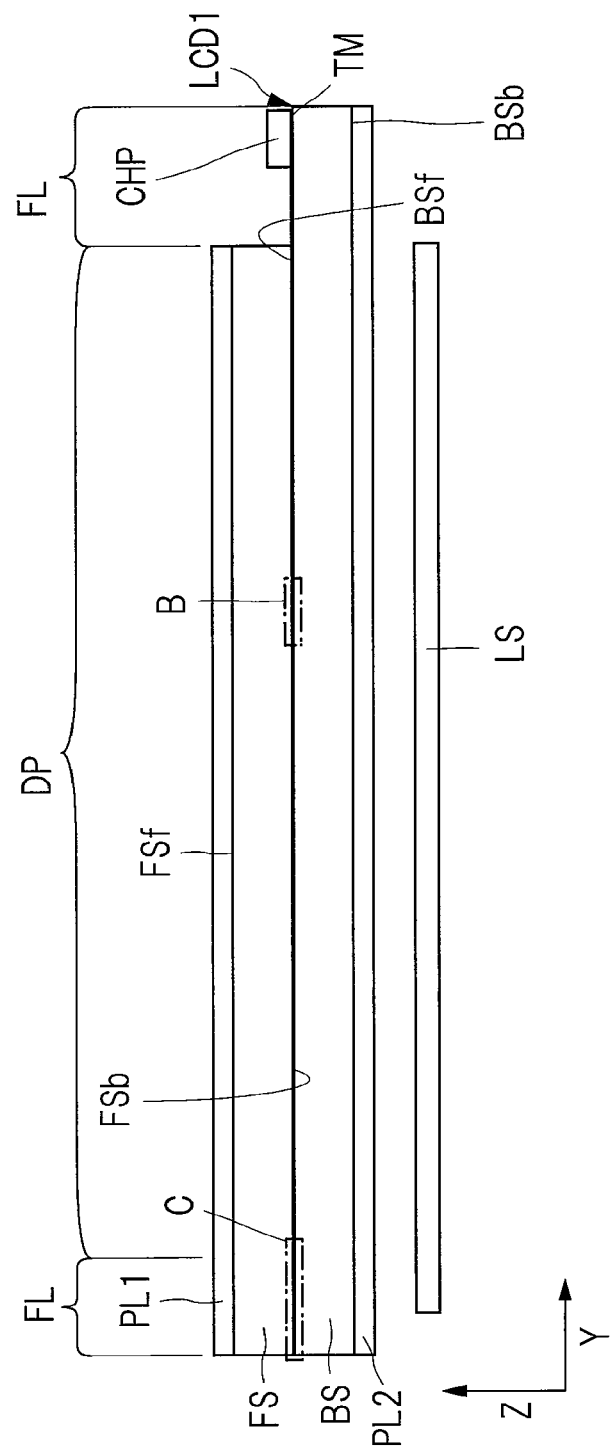
FIG. 2 is a cross-sectional view taken along a line A-A of FIG. 1.
Figure 3:
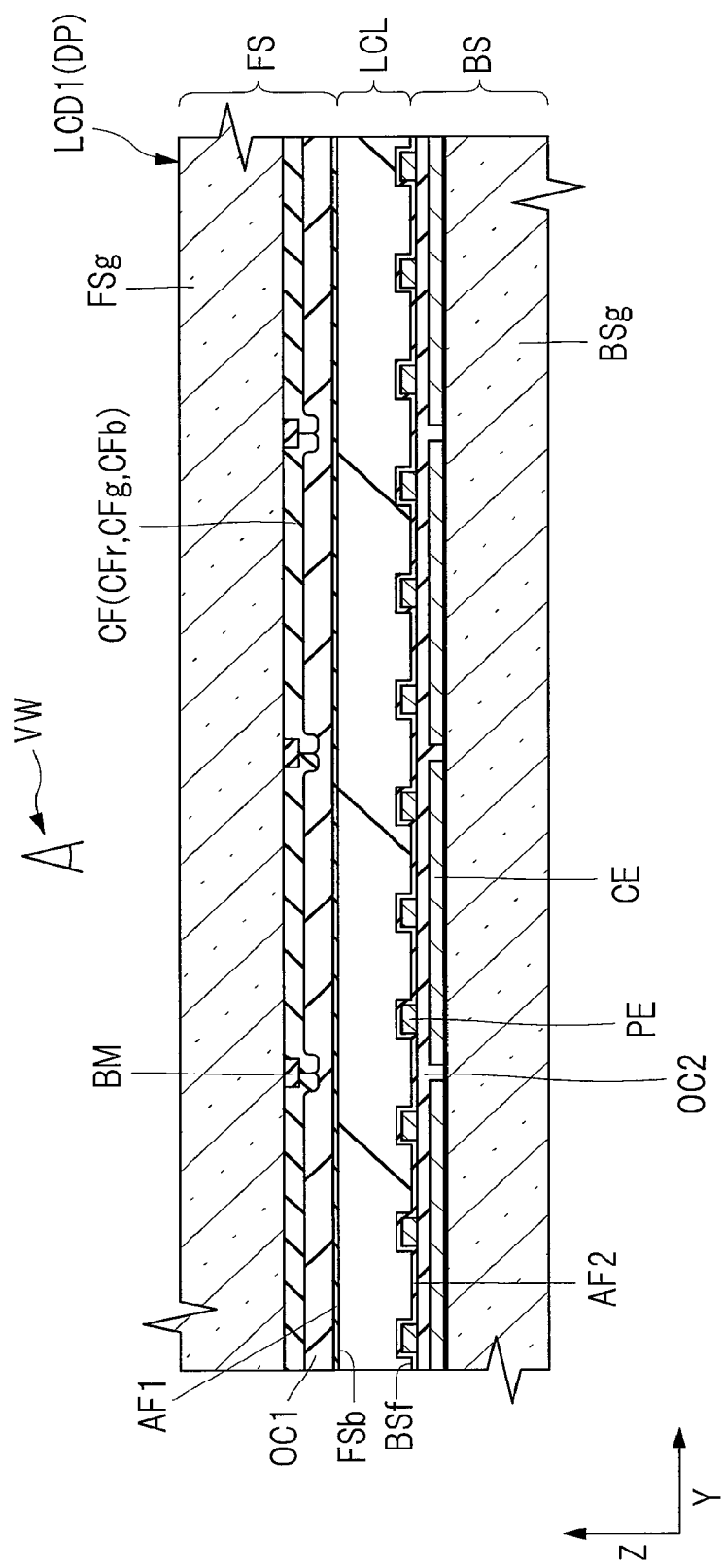
FIG. 3 is an enlarged cross-sectional view of a section B of FIG. 2.
Figure 4:
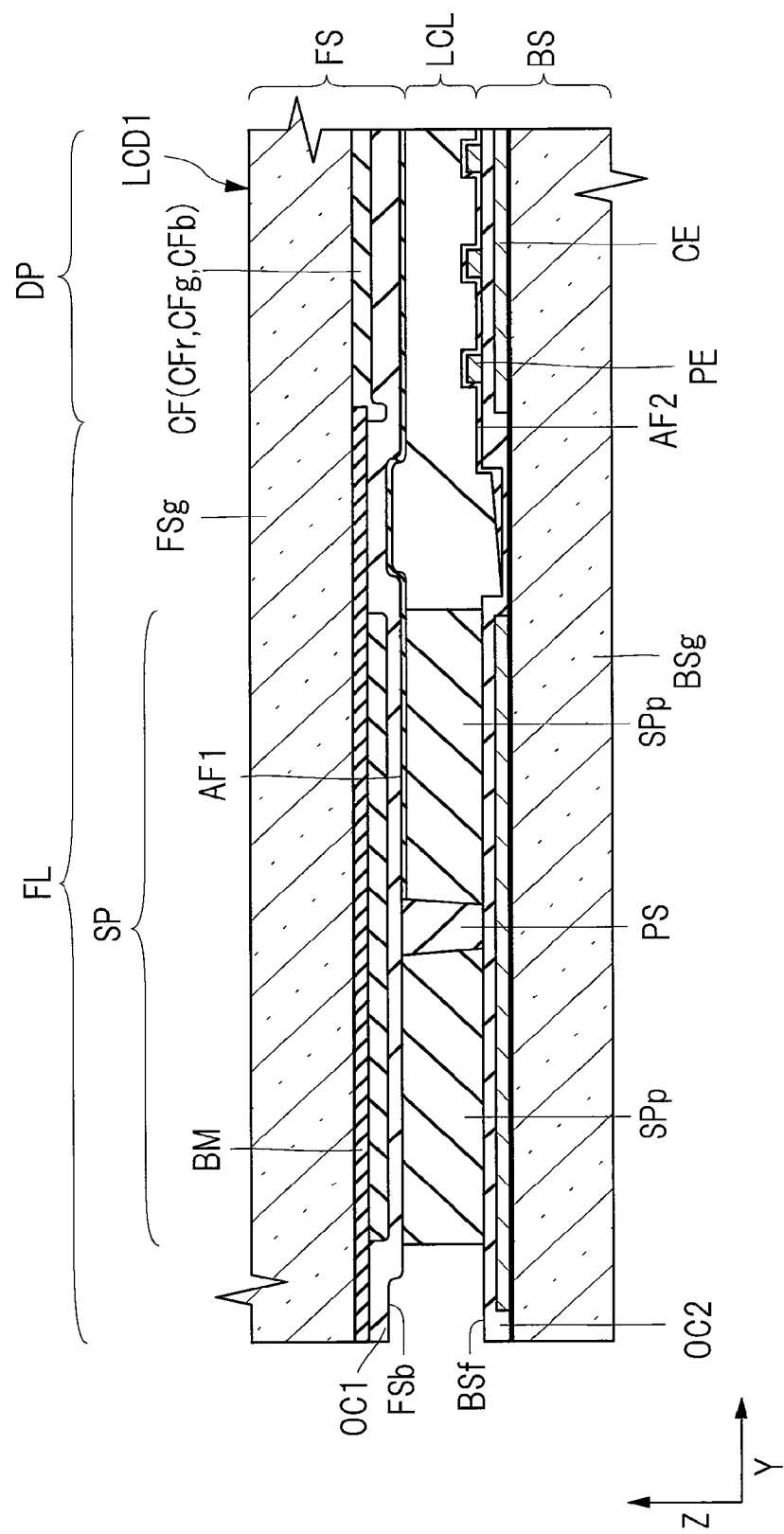
FIG. 4 is an enlarged cross-sectional view of a section C of FIG. 2.

First, a basic configuration of a display device will be described. FIG. 1 is a plan view illustrating an example of the display device of the present embodiment, and FIG. 2 is a cross-sectional view taken along a line A-A of FIG. 1. In addition, FIG. 3 is an enlarged cross-sectional view of a section B of FIG. 2. In addition, FIG. 4 is an enlarged cross-sectional view of a section C of FIG. 2.

Incidentally, FIG. 1 illustrates a contour of a display portion DP using a two-dot chain line in order to facilitate the viewability of a boundary between the display portion DP and a frame portion (peripheral area) FL when seen in a plan view. In addition, each of the plurality of wirings WL illustrated in FIG. 1 extends from the peripheral area of the display portion DP to the display portion DP. However, each part of a source line SL and a gate line GL is exemplarily illustrated for the sake of the viewability in FIG. 1. In addition, although FIG. 2 is the cross-sectional view, the hatching is omitted for the sake of the viewability.

As illustrated in FIG. 1, a display device LCD1 of the present embodiment includes the display portion DP which is a display area in which an image is formed according to an input signal to be supplied from the outside. In addition, the display device LCD1 includes the frame portion FL which is a non-display area provided in a frame shape around the display portion DP, when seen in a plan view. Incidentally, the display area of this display device has a rectangular shape, but the display area may have a polygonal shape or a circular shape. In addition, the display area may be formed to extend to a vicinity of an end portion of the display device. In this case, a peripheral area of the display area is not formed in a frame shape, but is referred to as a frame portion even in this case.

In addition, the display device LCD1 has a structure in which a liquid crystal layer LCL (see FIG. 3) serving as a display function layer is formed between a pair of substrates which are oppositely arranged. That is, as illustrated in FIG. 2, the display device LCD1 includes a substrate FS on a display surface side, a substrate BS positioned on the opposite side of the substrate FS, and the liquid crystal layer LCL (see FIG. 3) arranged between and the substrate FS and the substrate BS.

In addition, the substrate BS illustrated in FIG. 1 includes a side BSs1 extending along an X direction, a side BSs2 opposing the side BSs1, a side BSs3 extending along a Y direction orthogonal to the X direction, and a side BSs4 opposing the side BSs3, when seen in a plan view. Each distance from the side BSs2, the side BSs3, and the side BSs4, included in the substrate BS illustrated in FIG. 1 to the display portion DP, is the same, and is shorter than a distance from the side BSs1 to the display portion DP. Hereinafter, in the present application, "a peripheral edge portion of the substrate BS" indicates any one among the side BSs1, the side BSs2, the side BSs3, and the side BSs4 configuring an outer edge of the substrate BS. In addition, "a peripheral edge portion" merely indicates the peripheral edge portion of the substrate BS.

In the example illustrated in FIG. 1, the substrate BS has a rectangular planar shape of which a length in the X direction is shorter than a length in the Y direction orthogonal to the X direction. In other words, each length of the side BSs1 and the side BSs2 of the substrate BS is shorter than each length of the side BSs3 and the side BSs4. However, each length of the side BSs1 and the side BSs2 may be longer than each length of the side BSs3 and the side BSs4, as in a modification example to be described later.

In addition, an input unit IPC to which a signal to drive the liquid crystal layer LCL (see FIG. 3) serving as the display function layer is input is provided in the frame portion FL around the display portion DP. In other words, the input unit IPC is provided between the side BSs1 of the substrate BS and the display portion DP, in the frame portion FL of the display device LCD1. In addition, a lead-out wiring portion LD in which a plurality of wirings (lead-out wiring) WL are formed is provided between the side BSs1 of the substrate BS and the display portion DP. The display portion DP and the input unit IPC are electrically connected with each other via the lead-out wiring portion LD.

The input unit IPC is provided in an area along the side BSs1 of the substrate BS in the frame portion FL surrounding the display portion DP, in the example illustrated in FIG. 1. The input unit IPC includes a plurality of terminals TM arranged along the X direction. The plurality of terminals TM include a plurality of terminals TMS to transmit an image signal (which is also referred to as a data signal or an image data signal) to the source line SL, and a plurality of terminals TMG to transmit a scan signal (which is also referred to as an address signal or a gate signal) to the gate line GL.

In addition, a terminal group for the image signal terminal is arranged in a central area of the input unit IPC extending along the X direction, in the example illustrated in FIG. 1. The plurality of terminals TMS to which the image signal is input are arranged in the terminal group for the image signal terminal. On the other hand, a terminal group for a scan signal terminal is provided on both neighboring sides of the terminal group for the image signal terminal in the input unit IPC extending along the X direction. The plurality of terminals TMG to which the scan signal is input are arranged in the terminal group for the scan signal terminal.

In addition, the liquid crystal layer LCL (see FIG. 3) provided in the display portion DP is driven for each pixel (in detail, each subpixel) according to the signal to be applied to the input unit IPC. In detail, the input unit IPC is connected to the display portion DP in which a plurality of display elements are arranged via the lead-out wiring portion LD. The plurality of display elements provided in the display portion DP are provided in a matrix form for each pixel (in detail, each subpixel) in a matrix form, and perform switching operation. In the present embodiment, each of the plurality of display elements is a transistor, called a thin-film transistor (TFT) formed in a substrate. A plurality of source lines (data lines or image signal lines) SL extending along the Y direction and a plurality of gate lines (scan lines or address lines) GL extending along the X direction crossing the Y direction are provided in the display portion DP. The display element is provided in, for example, each position at which the plurality of source lines SL and the plurality of gate lines GL cross each other.

In addition, the lead-out wiring portion LD is provided in the frame portion FL around the display portion DP, and includes the plurality of wirings (lead-out wirings) WL which are electrically connected to the plurality of display elements of the display portion DP. The plurality of wirings WL include a wiring (lead-out wiring) WLS to be connected to the terminal TMS and a wiring (lead-out wiring) WLG to be connected to the terminal TMG.

In addition, a semiconductor chip CHP in which a drive circuit DR1 for display of an image or a control circuit CNT1 is formed is connected to the input unit IPC, as illustrated schematically in FIG. 1. The semiconductor chip CHP is mounted onto the substrate BS in the example illustrated in FIG. 2. However, a wiring substrate such as a so-called flexible substrate may be connected to the terminal TM, and the terminal TM may be connected to the semiconductor chip CHP via the wiring substrate as a modification example with respect to FIG. 2.

In addition, the display device LCD1 includes a seal portion SP (see FIG. 4) formed in the frame portion FL when seen in a plan view. The seal portion SP illustrated in FIG. 4 is formed to continuously surround a periphery of the display portion DP, and the substrate FS and the substrate BS are attached and fixed to each other by a seal material SPp provided in the seal portion SP. In this manner, it is possible to seal the liquid crystal layer LCL serving as the display function layer by providing the seal portion SP in the periphery of the display portion DP.

In addition, a polarizing plate PL2, which polarizes light generated from a light source LS, is provided on a back surface BSb side of the substrate BS of the display device LCD1, as illustrated in FIG. 2. The polarizing plate PL2 is fixed to the substrate BS. On the other hand, a polarizing plate PL1 is provided on a front surface FSf side of the substrate FS. The polarizing plate PL1 is fixed to the substrate FS.

Although FIG. 2 exemplarily illustrates basic components to form a display image, it is possible to add other components, in addition to the components illustrated in FIG. 2, as a modification example. For example, a protective film or a cover member may be attached to a front surface side of the polarizing plate PL1 as a protection layer that protects the polarizing plate PL1 from a scratch, dirt or the like. In addition, it is possible to apply the above-described configuration to an embodiment in which an optical element such as a retardation film is pasted on the polarizing plate PL1 and the polarizing plate PL2, for example. Alternatively, it is possible to employ a method of depositing an optical element on each of the substrate FS and the substrate BS.

In addition, the display device LCD1 includes a plurality of pixel electrodes PE, and a common electrodes CE to be arranged between the substrate FS and the substrate BS, as illustrated in FIG. 3. Since the display device LCD1 of the present embodiment is a display device of a horizontal electric field mode as described above, the plurality of pixel electrodes PE and the common electrode CE are formed in the substrate BS.

The substrate BS includes a base material BSg made of a glass substrate or the like, and the image display circuit is mainly formed in the base material BSg. The substrate BS includes a front surface BSf positioned on the substrate FS side and the back surface BSb (see FIG. 2) positioned on the opposite side thereof. In addition, the display element such as the TFT, and the plurality of pixel electrodes PE are formed in a matrix form on the front surface BSf side of the substrate BS.

Since the display device LCD1 of the horizontal electric field mode (in detail, FFS mode) is illustrated in the example illustrated in FIG. 3, the common electrode CE is formed on the front surface side of the base material BSg provided in the substrate BS, and is covered by an insulation film OC2. In addition, the plurality of pixel electrodes PE are formed on the substrate FS side of the insulation film OC2 to be opposed to the common electrode CE via the insulation film OC2. The insulation film OC2 functions as a protective film that protects an electrode or the wiring WL (see FIG. 1) to be formed on the substrate BS side. Although the insulation film OC2 has a large variety of modification examples, it is assumed to be a stacked film in which an organic insulation film such as a resin film is stacked on an inorganic insulation film such as silicon oxide in the present embodiment.

In addition, the substrate FS is a substrate in which a color filter CF to form an image of color display is formed in the base material FSg made of a glass substrate, and includes the front surface FSf (see FIG. 2) on the display surface side, and a back surface FSb positioned on the opposite side of the front surface FSf. The substrate in which the color filter CF is formed, such as the substrate FS, is opposed to a TFT substrate in which the above-described TFT is formed, with the color filter substrate, or the liquid crystal layer being interposed therebetween when being distinguished from the TFT substrate, and thus, is called a counter substrate. Incidentally, a configuration in which the color filter CF is provided in the TFT substrate may be employed, as a modification example with respect to FIG. 3.

The color filter CF, which is configured by periodically arranging color filter pixels CFr, CFg and CFb of three colors of red (R), green (G) and blue (B), is formed on one surface of the base material FSg (for example, the glass substrate or the like) in the substrate FS. One pixel (also referred to as a single pixel) is configured using subpixels of the three colors of red (R), green (G) and blue (B) as a set, for example, in a color display device. The plurality of color filter pixels CFr, CFg and CFb of the substrate FS, and the subpixels including the pixel electrodes PE formed in the substrate BS are arranged at positions opposing each other.

In addition, a light-shielding film BM is formed at each boundary among the color filter pixels CFr, CFg and CFb of the respective colors. The light-shielding film BM is called a black matrix, and is made of, for example, black resin, or metal with low reflectivity. The light-shielding film BM is formed in a grid shape when seen in a plan view. That is, the substrate FS includes the color filter pixels CFr, CFg and CFb of the respective colors which are formed in opening portions of the light-shielding film BM formed in the grid shape. Incidentally, the colors to configure the single pixel are not limited to the three colors of red (R), green (G) and blue (B). In addition, the black matrix is not limited to have the grid shape, and may have a stripe shape.

Incidentally, an area which is described as the display portion DP or the display area is defined as an area on the inner side than the frame portion FL, in the present application. In addition, the frame portion FL is an area covered by the light-shielding film BM which shields light incident from the light source LS illustrated in FIG. 2. The light-shielding film BM is formed also in the display portion DP, and the plurality of opening portions are formed in the light-shielding film BM, in the display portion DP. In general, an end portion of the opening portion, formed on the most peripheral edge portion side among the opening portions formed in the light-shielding film BM and in which the color filters CF are embedded, is defined as the boundary between the display portion DP and the frame portion FL.

In addition, the substrate FS includes an insulation film OC1 that covers the color filter CF. Since the light-shielding film BM is formed at the boundary among the color filter pixels CFr, CFg and CFb of the respective colors, an inner surface of the color filter CF is formed as an uneven surface. The insulation film OC1 functions as a flattening film that flattens the unevenness of the inner surface of the color filter CF. Alternatively, the insulation film OC1 functions as a protective film that prevents impurities from being diffused from the color filter CF to the liquid crystal layer. The insulation film OC1 contains a component, which is cured when energy is applied, such as a thermosetting resin component, or a photocurable resin component, in a material, and thus, the resin material can be cured.

In addition, the liquid crystal layer LCL, which forms a display image when a voltage for display is applied between the pixel electrode PE and the common electrode CE, is provided between the substrate FS and the substrate BS. The liquid crystal layer LCL modulates light passing therethrough depending on a state of the applied electric field.

In addition, the substrate FS includes an alignment film AF1 to cover the insulation film OC1 on the back surface FSb which is an interface in contact with the liquid crystal layer LCL. In addition, the substrate BS includes an alignment film AF2 to cover the insulation film OC2 and the plurality of pixel electrodes PE on the front surface BSf which is an interface in contact with the liquid crystal layer LCL. These alignment films AF1 and AF2 are resin films which are formed to align an initial alignment of liquid crystal included in the liquid crystal layer LCL, and are made of, for example, a polyimide resin.

A method of displaying a color image according to the display device LCD1 illustrated in FIG. 3 is as follows, for example. That is, the light emitted from the light source LS (see FIG. 2) is filtered by the polarizing plate PL2 (see FIG. 2), and the light passing through the polarizing plate PL2 is incident to the liquid crystal layer LCL. The light incident to the liquid crystal layer LCL is propagated in a thickness direction of the liquid crystal layer LCL (in other words, a direction from the substrate BS toward the substrate FS) while changing a polarization state depending on refractive index anisotropy (in other words, birefringence) of the liquid crystal, and is emitted from the substrate FS. At this time, the liquid crystal alignment is controlled by an electric field to be formed when the voltage is applied to the pixel electrode PE and the common electrode CE, and the liquid crystal layer LCL functions as an optical shutter. In other words, it is possible to control the transmittance of light for each subpixel in the liquid crystal layer LCL. The light having reached the substrate FS is subject to color filtering processing (that is, processing in which light other than a predetermined wavelength is absorbed) in the color filter formed in the substrate FS, and is emitted from the front surface FSf. In addition, the light emitted from the front surface FSf reaches a viewer VW via the polarizing plate PL1.

In addition, the seal portion SP, provided on the peripheral edge portion side of the liquid crystal layer LCL, is provided with the seal material (sealing material) SPp, as illustrated in FIG. 4. The liquid crystal layer LCL is sealed in an area surrounded by the seal material SPp. In other words, the seal material SPp serves a function as the sealing material that prevents the liquid crystal layer LCL from leaking. In addition, the seal material SPp is in close contact with each of the back surface FSb of the substrate FS and the front surface BSf of the substrate BS, and the substrate FS and the substrate BS are attached and fixed to each other via the seal material SPp. In other words, the seal material SPp serves a function as an adhesion member that attaches and fixes the substrate FS and the substrate BS.

In addition, the seal portion SP includes a member PS which is a member that is arranged in a periphery of the liquid crystal layer LCL, and extends along an outer edge of the liquid crystal layer LCL, in the example illustrated in FIG. 4. The member PS functions as a damming member to dam a spread of the alignment film AF1. In addition, a thickness of the liquid crystal layer LCL illustrated in FIGS. 3 and 4 is extremely thin as compared to a thickness of the substrate FS or the substrate BS. For example, the thickness of the liquid crystal layer LCL is a thickness of about 0.1% to 10%, as compared with the thickness of the substrate FS or the substrate BS. The thickness of the liquid crystal layer LCL is about, for example, 3 μm to 4 μm, in the examples illustrated in FIGS. 3 and 4.

<Details of Lead-Out Wiring Portion>

Figure 5:
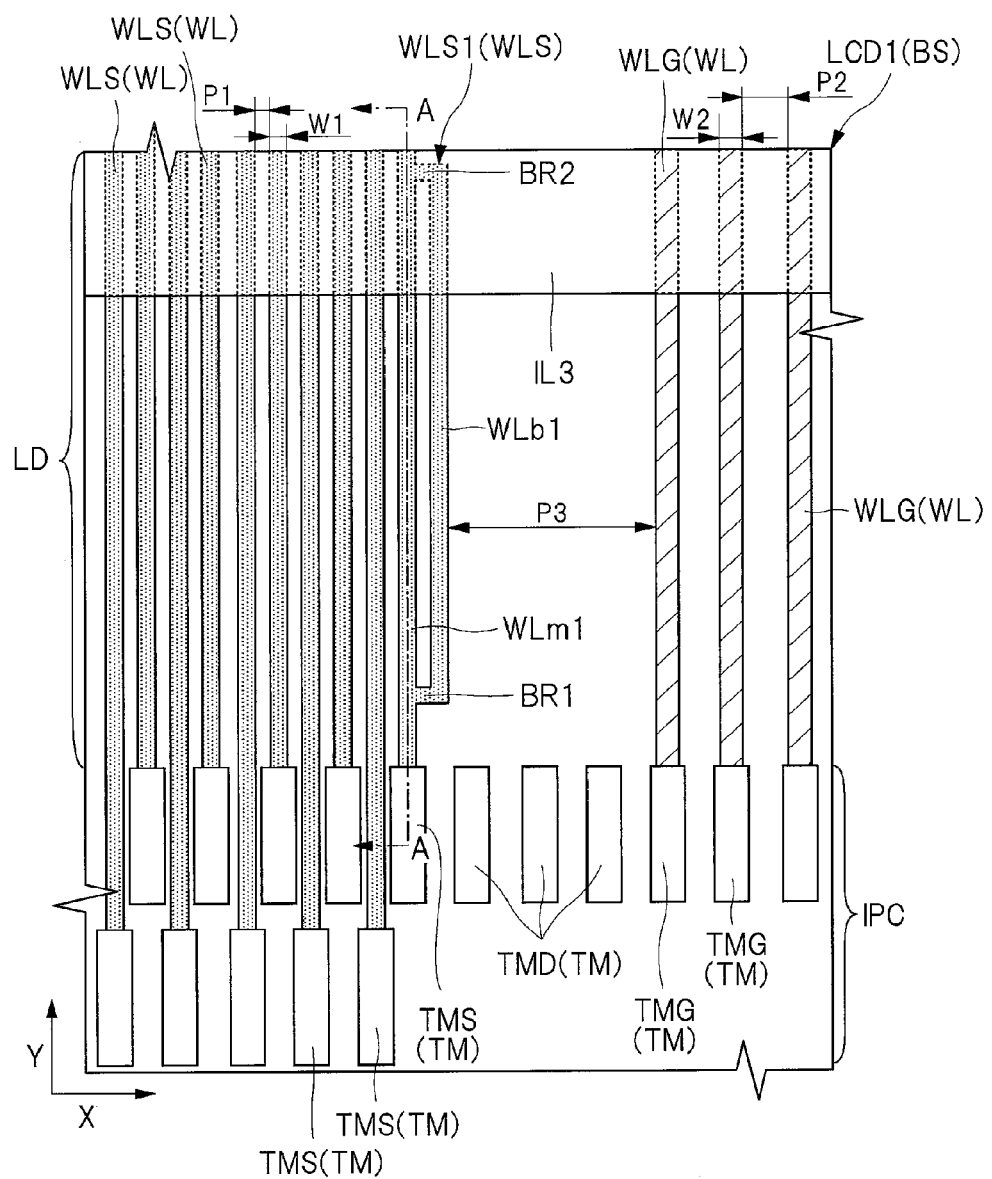
FIG. 5 is an enlarged plan view illustrating the layout of a lead-out wiring portion illustrated in FIG. 1.
Figure 6:
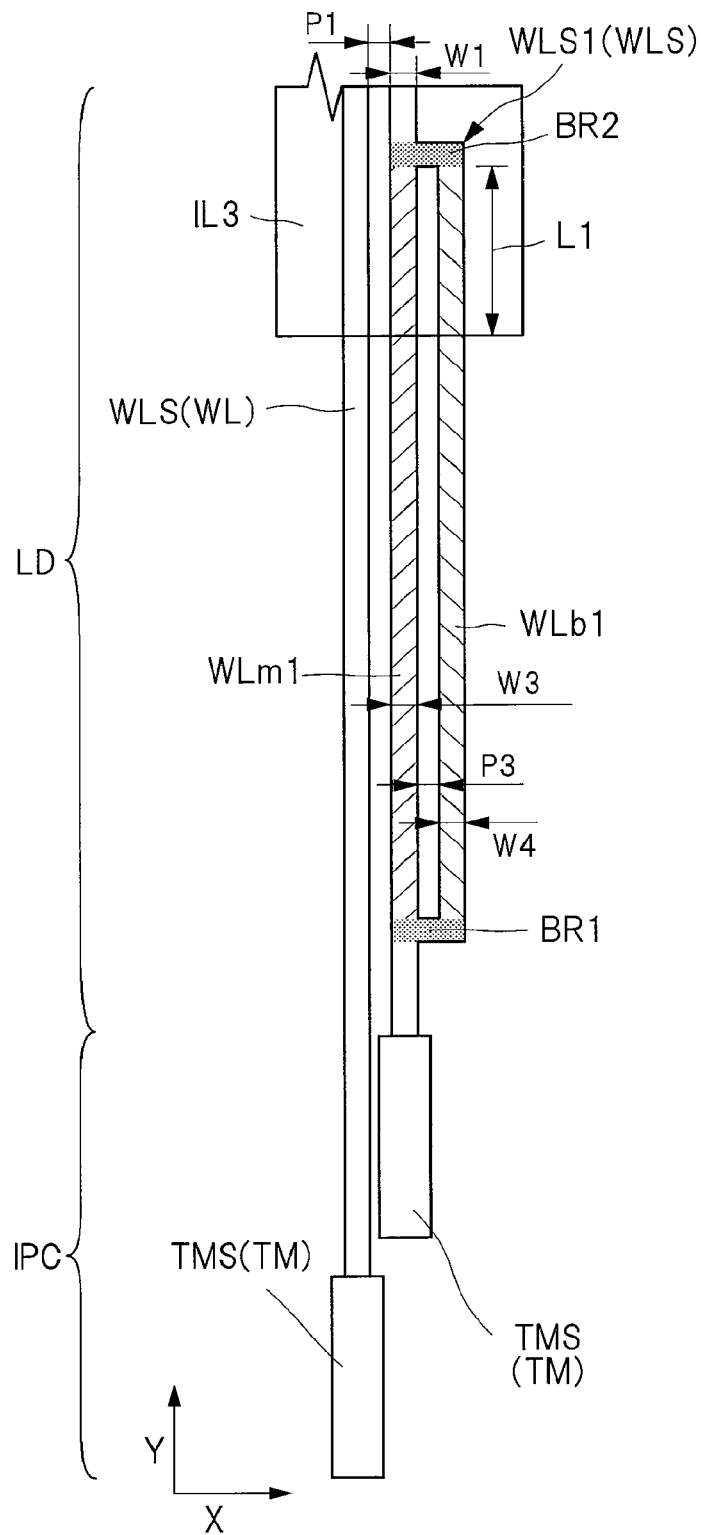
FIG. 6 is an enlarged plan view illustrating a lead-out wiring provided at an end portion of an array, and a neighboring lead-out wiring thereof among a plurality of the lead-out wirings illustrated in FIG. 5.
Figure 7:
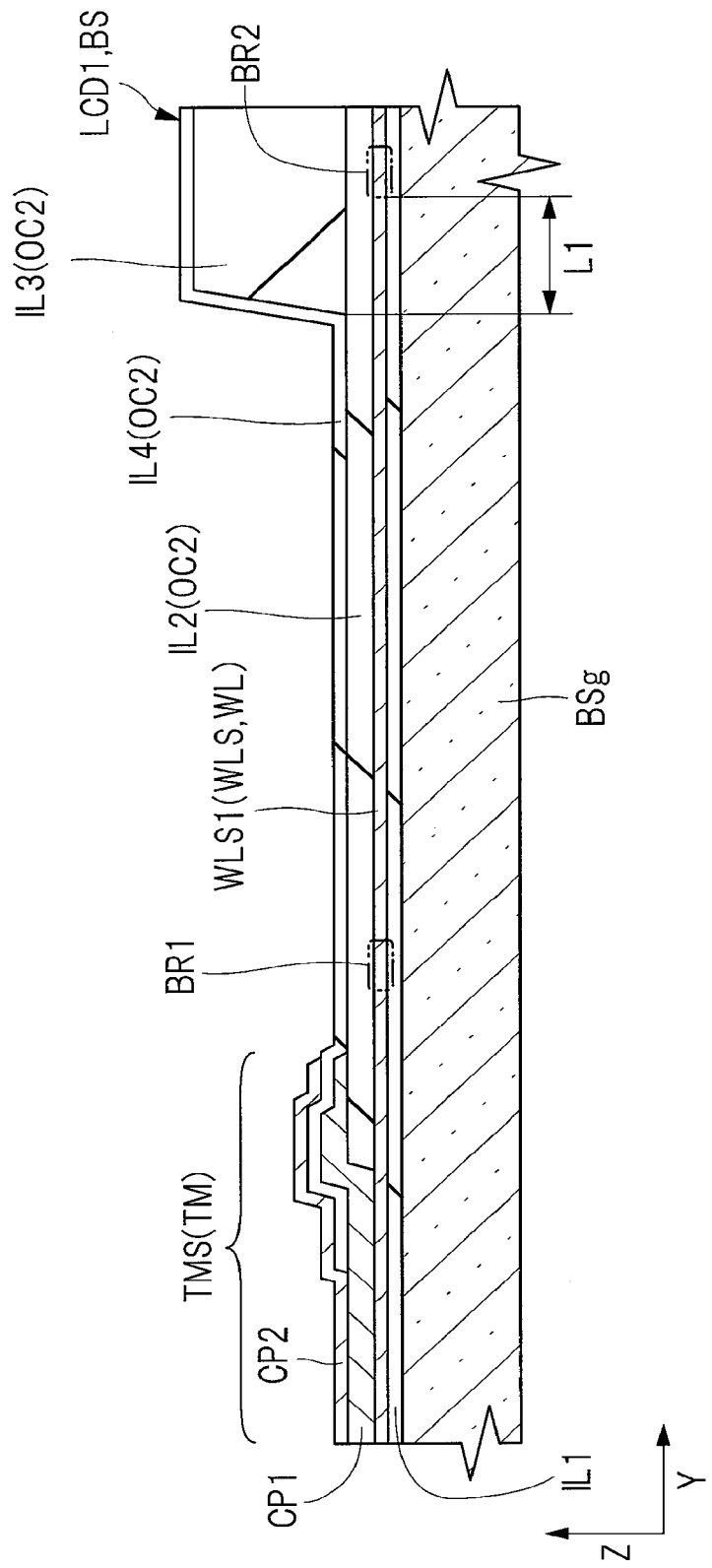
FIG. 7 is an enlarged cross-sectional view taken along a line A-A of FIG. 5.

Next, a description will be given regarding details of the lead-out wiring portion LD illustrated in FIG. 1. FIG. 5 is an enlarged plan view illustrating the layout of a lead-out wiring portion illustrated in FIG. 1. In addition, FIG. 6 is an enlarged plan view illustrating a lead-out wiring provided at an end portion of the array, and a neighboring lead-out wiring thereof among a plurality of lead-out wirings illustrated in FIG. 5. In addition, FIG. 7 is an enlarged cross-sectional view taken along a line A-A of FIG. 5.

Incidentally, FIG. 5 illustrates a state in which the semiconductor chip CHP illustrated in FIG. 2 is removed in order to facilitate the viewability of the plurality of terminals TM provided in the input unit IPC. In addition, although FIG. 5 is the plan view, the wirings WL are attached with patterns different from each other, in order to facilitate recognition of the wiring WLS to be connected to the source line SL (see FIG. 1) and the gate line GL (see FIG. 1) to transmit the scan signal. In addition, FIG. 5 illustrates a contour of each part of the plurality of wirings WL covered by an organic insulation film IL3 using the dotted line, in order to explicitly illustrate a boundary between each part of the plurality of wirings WL covered by the organic insulation film IL3 and the other part thereof exposed from the organic insulation film IL3. Meanwhile, the part of the wiring WL exposed from the organic insulation film IL3 is covered by an inorganic insulation film IL2 and an inorganic insulation film IL4 as illustrated in FIG. 7, and the part exposed from the organic insulation film IL3 is illustrated using the solid line in FIG. 5, in order to explicitly illustrate whether to be exposed from the organic insulation film IL3. In addition, FIG. 6 illustrates a main line WLm1, a bypass line WLb1, a branch portion BR1, and a branch portion BR2 of an end-portion wiring WLS1 by attaching the different pattern thereto, in order to explicitly illustrate each boundary thereof. In addition, FIG. 7 illustrates positions to which branch portions BR1 and BR2 are connected using the two-dot chain lines, in order to explicitly illustrate the positions to which the branch portions BR1 and BR2 illustrated in FIG. 6 are connected.

The plurality of terminals TM of the input unit illustrated in FIG. 1 are arranged collectively for each type of signal to be input in the present embodiment. For example, the input unit IPC includes an image signal input terminal group. The plurality of terminals TMS to which the image signal is input are arranged in the image signal input terminal group. In addition, the input unit IPC includes a scan signal input terminal group. The plurality of terminals TMG to which the scan signal is input are arranged in the scan signal input terminal group. The scan signal input terminal groups in which the plurality of terminals TMG are arranged are separately provided at two places along the X direction, and the image signal input terminal group is provided between the scan signal input terminal groups provided at the two places, in the example illustrated in FIG. 1.

In addition, the wiring WL provided in the lead-out wiring portion LD is connected to each of the plurality of terminals TM. The lead-out wiring portion LD includes the plurality of wirings WLS to be connected to the plurality of terminals TMS. In addition, the lead-out wiring portion LD includes the plurality of wirings WLG to be connected to the plurality of terminals TMG.

In addition, each cross-sectional structure of the terminal TM and the wiring WL is as follows, for example. An upper side of the base material BSg of the substrate BS is covered by an inorganic insulation film IL1, as illustrated in FIG. 7. The inorganic insulation film IL1 is made of, for example, a silicon oxide film, a silicon nitride film, or a stacked film of these films. The wiring WL is formed on the inorganic insulation film IL1. In addition, the wiring WL is covered by the inorganic insulation film IL2. The inorganic insulation film IL2 is made of, for example, a silicon oxide film, a silicon nitride film, or a stacked film of these films. A part of the wiring WL, other than a part to be connected to the terminal TM, is covered by the inorganic insulation film IL2. Meanwhile, a conductor pattern CP1 configuring the terminal TM is exposed from the inorganic insulation film IL2. The wiring WL extends to a part of the terminal TM, and is electrically connected to the conductor pattern CP1 in the part of the terminal TM.

In addition, a part of the wiring WL is covered by the organic insulation film IL3. The organic insulation film IL3 is a resin film which is thicker than the inorganic insulation film IL2. It is possible to protect the wiring WL by providing the organic insulation film IL3. In addition, the organic insulation film IL3 is softer than the inorganic insulation film IL2, and thus, it is possible to flatten an upper surface of the organic insulation film IL3 (a surface opposing the substrate FS illustrated in FIG. 2). However, the organic insulation film IL3 is thicker as described above, and thus, this makes it difficult to connect the semiconductor chip CHP illustrated in FIG. 2, or the like, to the terminal TM when the organic insulation film IL3 is extended to the vicinity of the part of the terminal TM. Thus, although the part of the wiring WL is covered by the organic insulation film IL3 as illustrated in FIG. 7, the part of the wiring WL, which is in the vicinity of the terminal TM, is exposed from the organic insulation film IL3.

Incidentally, the entire part of the organic insulation film IL3 and the inorganic insulation film IL2 and a part of the conductor pattern CP1 are covered by the inorganic insulation film IL4 serving as a passivation film, in the example illustrated in FIG. 7. The inorganic insulation film IL4 is made of, for example, silicon nitride or the like. In addition, a conductor pattern CP2 is formed so as to cover the inorganic insulation film IL4 in the terminal TM, and a part of the conductor pattern CP2 is electrically connected to the conductor pattern CP1. Accordingly, the conductor pattern CP1 and the conductor pattern CP2 function as terminals.

It is possible to use an electrode material, for example, indium tin oxide (ITO) or the like for the conductor pattern CP1 and the conductor pattern CP2. In addition, a metal film containing aluminum or the like may be also used for the conductor pattern CP2. For example, it is possible to form the terminal TM together with the pixel electrode PE or the common electrode CE by forming the conductor patterns CP1 and CP2, which configure the terminal TM, using the same material as the pixel electrode PE or the common electrode CE illustrated in FIG. 3. In addition, it is possible to form the wiring WL, using metal in the same layer as a gate electrode of the thin-film transistor included in the pixel. In this case, it is possible to form the conductor pattern CP2 using a metal film in the same layer as a source electrode or a drain electrode of the thin-film transistor. As a matter of course, it may be configured such that the conductor pattern CP1 and the wiring WL are directly connected to each other, without providing the conductor pattern CP2.

Here, a description will be given regarding points that have been studied by the inventors of the present application and findings that have been obtained through the study, as to the display device which has been described above. The number of signal lines (wirings for signal transmission), which are formed in the display device, tends to increase, as definition of the display image becomes higher. In addition, an arrangement space of the signal lines tends to decrease, as the frame portion FL (see FIG. 1) of the display device becomes narrower. Thus, there is a tendency that a wiring width of the signal lines becomes thin, and an arrangement interval between the neighboring signal lines becomes small.

When the wiring width of the signal lines becomes thin in this manner, a technique to suppress damage of each signal line is required. For example, when some of the signal lines to transmit an image signal are disconnected, an image is not displayed in the pixels connected to the disconnected signal lines, thereby causing reduction in display quality. However, it has been found out that the damage is easily generated in some of the wirings, as the wiring pattern of the signal lines becomes finer, according to the study of the inventors of the present application. More specifically, it has been found out to have a tendency that some wirings among the plurality of wirings are disconnected in a shorter time, as compared to the other wirings.

As the inventors of the present application have studied a cause of the above-described phenomenon, it has been found out that the above-described damage of the wiring is mainly caused by a discharge phenomenon called an ESD. Hereinafter, a description will be given regarding an example of a mode that some of the wirings are damaged due to the ESD.

First, there is a case in which some of the conductor patterns, such as the wiring WL or the terminal TM, are charged in any operation of a manufacturing process of the display device. A process of forming the inorganic insulation films IL2, IL4 or the organic insulation film IL3 is considered, as a process having a possibility to induce the charge of the conductor pattern. In addition, there is a case in which a rubbing process is performed at the time of aligning the alignment of liquid crystal molecules of the liquid crystal layer LCL (see FIG. 3), in the manufacturing process of the liquid crystal display device as in the example of the present embodiment. A case in which the conductor pattern is rubbed by a rubbing fabric, and thus charged during the rubbing process is also considered.

Next, when another conductor material approaches the conductor pattern in the charged state, the ESD is sometimes generated between the conductor material and the conductor pattern. It is considered that examples of the conductor material to induce the ESD include a metallic residue contained into an etching solution or the like, in addition to the metal material used in the manufacturing process.

In addition, the wiring is not yet disconnected at a point in time at which the above-described ESD is generated in many cases. However, although the disconnection of the wiring is not yet generated, the damaged point of the wiring develops along with the elapse of time, thereby eventually causing the disconnection in some cases, once the damage is generated in the wiring. Thus, it is considered to have confirmed the tendency that some wirings among the plurality of wirings are disconnected in a shorter time, as compared to the other wirings.

In addition, it has been found out that damage is easily generated in a wiring formed at a specific position among the plurality of wirings, as the inventors of the present application have conducted a further study. That is, it has been found out that the damage is easily generated in the end-portion wiring provided in the end portion of the array, and the damage is hardly generated in the wirings other than the end portion of the array in a case in which the plurality of wirings are arranged at a constant interval. In addition, it has been found out that the damage is easily generated in a wiring of which a wiring width is relatively thinner, in a case in which wirings having different wiring widths are formed. Further, it has been found out that the damage is generated in the part exposed from the organic insulation film IL3 in a case in which the part of the wiring is covered by the organic insulation film IL3 and the other part of the wiring is exposed from the organic insulation film IL3, as illustrated in FIG. 5.

The configuration of the present embodiment has been found out from the above-described findings by conducting studies regarding a technique of suppressing the damage of the wiring pattern even in a case in which the ESD is generated, and thus improving the reliability of the display device. That is, the display device of the present embodiment is configured such that the end-portion wiring WLS1, which is provided in the end portion of the array, among the plurality of wirings WLS, has a different shape from the wirings WLS other than the end-portion wiring WLS1, as illustrated in FIG. 5. As illustrated in FIG. 6, the end-portion wiring WLS1 includes the main line WLm1, which extends along the extending direction (the Y direction in FIG. 6) of the neighboring wiring WLS, the bypass line WLb1 which extends along the main line WLm1, and the branch portions BR1 and BR2 which connect the main line WLm1 and the bypass line WLb1 to each other.

In other words, the bypass line WLb1 is provided, in addition to the main line WLm1, in the end-portion wiring WLS1 in which the damage caused by the above-described ESD is easily generated, and the main line WLm1 and the bypass line WLb1 are connected at two points according to the present embodiment. Accordingly, even in a case in which any one of the main line WLm1 and the bypass line WLb1 is damaged, the other one remains without being damaged, and thus, it is possible to prevent the disconnection of the signal transmission path.

As the inventors of the present application have experimentally confirmed, the bypass line WLb1, which is provided on the end portion side of the array, is most likely to be damaged, in the examples illustrated in FIGS. 5 and 6. In addition, there is also a case in which the main line WLm1 of the end-portion wiring WLS1 is damaged, but the damage of the bypass line WLb1 has not been observed in such a case. In other words, a case in which both the main line WLm1 and the bypass line WLb1 are damaged has not been confirmed. This is because it is considered that any one of the main line WLm1 or the bypass line WLb1 is focused as a discharge target when the ESD is generated, and thus, the other wiring other than the discharge target is hardly damaged.

In this manner, the end-portion wiring WLS1 in which the damage of the wiring is easily generated includes the main line WLm1 and the bypass line WLb1 according to the present embodiment, and thus, it is possible to suppress the disconnection of the signal transmission path even in a case in which the ESD is generated. Thus, it is possible to improve the reliability of the display device.

Meanwhile, a structure in which all the plurality of wirings WL include the main line WLm1 and the bypass line WLb1 may be applied, as a modification example with respect to the present embodiment, although not illustrated. However, twice or more times of the space in which the wiring WLS is arranged is required in such a case, as compared to the present embodiment. In addition, the damage of the wiring caused by the ESD is generated particularly in the end portion of the array, and is hardly generated in the wirings other than the end portion, according to the study of the inventors of the present application. Therefore, it is preferable that the wirings WLS other than the end-portion wiring WLS1 do not include the bypass line WLb1 on the consideration of a viewpoint to improve a degree of integration of the signal transmission path.

In addition, it has been found out that damage is generated in the part exposed from the organic insulation film IL3 in a case in which the part of the wiring is covered by the organic insulation film IL3 (see FIGS. 5 and 7) and the other part of the wiring is exposed from the organic insulation film IL3, as described above. This is because the discharge phenomenon is hardly generated in the part covered by the organic insulation film IL3 having a large thickness, since a distance from another conductive material is distant even in a case in which the wiring WL is charged, as illustrated in FIG. 7. Thus, the damage of the wiring WL caused by the ESD is hardly generated in the part covered by the organic insulation film IL3. On the contrary, since the thickness of the inorganic insulation film IL2 is thin in the part exposed from the organic insulation film IL3, the ESD is easily generated when the wiring WL is charged. As a result, it is considered that the damage of the wiring WL caused by the ESD is easily generated in the part exposed from the organic insulation film IL3. For example, the thickness of the organic insulation film IL3 is a thickness of about several times to several ten times with respect to the thickness of the inorganic insulation film IL2, in the example illustrated in FIG. 7.

In addition, since the discharge phenomenon is hardly generated in the part covered by the organic insulation film IL3 having a large thickness, as described above, the damage of the wiring caused by the ESD is hardly generated. Thus, it is preferable that the branch portion BR1 or the branch portion BR2 illustrated in FIG. 5 or 7 be covered by the organic insulation film IL3. Accordingly, damage is generated at any one of the main line WLm1 and the bypass line WLb1 illustrated in FIG. 6 even if the wiring is damaged. Therefore, it is possible to prevent the disconnection of the signal transmission path. However, it is difficult to connect the semiconductor chip CHP illustrated in FIG. 2, for example, or the like to the terminal TM, in a case in which the organic insulation film IL3 is provided in the vicinity of the terminal TM, as described above. Accordingly, the branch portion BR2, provided in the position relatively distant from the terminal TM is covered by the organic insulation film IL3, and the branch portion BR1, provided in the position close to the terminal TM, is exposed from the organic insulation film IL3, in the example illustrated in FIG. 5. In this case, it is possible to allow an electronic component, such as the semiconductor chip CHP, to be easily connected to the terminal TM, and to suppress the disconnection of the signal transmission path caused by the damage of the wiring.

An area of the wiring WL exposed from the organic insulation film IL3 is in the vicinity of the terminal TM, as described above. As illustrated in FIG. 1, the lead-out wiring portion LD includes an extending part in which each of the plurality of wirings WL extends along the Y direction from each of the plurality of terminals TM, and an inclined part in which each of the plurality of wirings WL extends to be inclined with respect to the Y direction and the X direction orthogonal to the Y direction. In addition, the above-described extending part of the lead-out wiring portion LD is provided at a position closer to the input unit IPC than the above-described inclined part. Accordingly, the bypass line WLb1 illustrated in FIG. 5 is provided in an area in which the end-portion wiring WLS1 extends along the Y direction, that is, in the above-described extending part.

In addition, each part of the main line WLm1 (see FIG. 6) and the bypass line WLb1 is also covered by the organic insulation film IL3 in a case in which the branch portion BR2 is covered by the organic insulation film IL3, as illustrated in FIGS. 6 and 7. It is preferable that a distance L1 from a peripheral edge portion of the organic insulation film IL3 to the branch portion BR2 be equal to or larger than 10 μm, from a viewpoint to allow the branch portion BR2 to be reliably covered by the organic insulation film IL3, in consideration of a positional accuracy to form the organic insulation film IL3. In addition, it is preferable that the distance L1 be equal to or larger than 100 μm from a viewpoint to prevent the damaged point from developing and reaching the branch portion BR2, in a case in which the wiring WL is damaged in the vicinity of the boundary between the part covered by the organic insulation film IL3 and the part exposed from the organic insulation film IL3.

In addition, in a case in which the two types of the wiring WLS and the wiring WLG, each having different wiring widths, are provided in the lead-out wiring portion LD, as illustrated in FIG. 5, according to the study of the inventors of the present application, the above-described ESD is easily generated in the wiring WLS with the relatively thinner wiring width. Each of the plurality of wirings WLS to which the image signal is input has a wiring width W1, and is arranged to be side by side at an interval P1 along the X direction, in the example illustrated in FIG. 5. On the other hand, each of the plurality of wirings WLG to which the scan signal is input has a wiring width W2, and is arranged to be side by side at an interval P2 along the X direction.

The number of the terminals TMS to which the image signal is input is likely to be larger than the number of the terminals TMG to which the scan signal is input. Thus, the wiring width W1 and the interval P1 of the wiring WLS decrease when a large number of the wirings WLS are arranged in the limited space. For example, the wiring width W1 is about 5 μm to 6 μm, and the interval P1 is about 10 μm to 15 μm. On the other hand, the wiring width W2 of the wiring WLG connected to the terminal TMG to which the scan signal is input is about 20 μm to 30 μm, and the interval P2 is about 10 μm to 15 μm. In this case, the damage of the wiring WLS caused by the ESD is sometimes generated, but the generation of damage of the wiring WLG caused by the ESD is not observed. Accordingly, each of the plurality of wirings WLG is not formed to have a structure like the end-portion wiring WLS1, that is, the structure provided with the bypass line WLb1, in the present embodiment. As the bypass line WLb1 is not provided in the wiring WLG in which the damage caused by the ESD is hardly generated in this manner, it is possible to improve the efficiency in the arrangement space of the wirings WLG and improve the degree of integration of the signal transmission path.

In addition, the discharge phenomenon (the ESD) with respect to the end-portion wiring WLS1, illustrated in FIG. 5, is likely to be generated, in a case in which an interval (spacing distance) P3 between the end-portion wiring WLS1 provided in the end portion of the array and the wiring WLG provided next to the end-portion wiring WLS1 is larger than each of the intervals P1 among the plurality of wirings WLS. Particularly, the ESD is easily generated in a case in which the interval P3 is ten or more times of the interval P1, like the display device LCD1 illustrated in FIG. 5, and thus, it is preferable that the end-portion wiring WLS1, which is provided in the end portion of the array, among the plurality of wirings WLS, includes the main line WLm1, the bypass line WLb1, the branch portion BR1, and the branch portion BR2.

Meanwhile, the ESD is hardly generated in a case in which the wiring WLG is provided up to the vicinity of the end-portion wiring WLS1, as a modification example with respect to the display device LCD1 illustrated in FIG. 5.

Accordingly, the bypass line WLb1 is not necessarily provided in the end-portion wiring WLS1, in a case in which the interval P3 is less than ten times of the interval P1, and particularly in a case in which the interval P3 is smaller than the interval P1.

Figure 8:
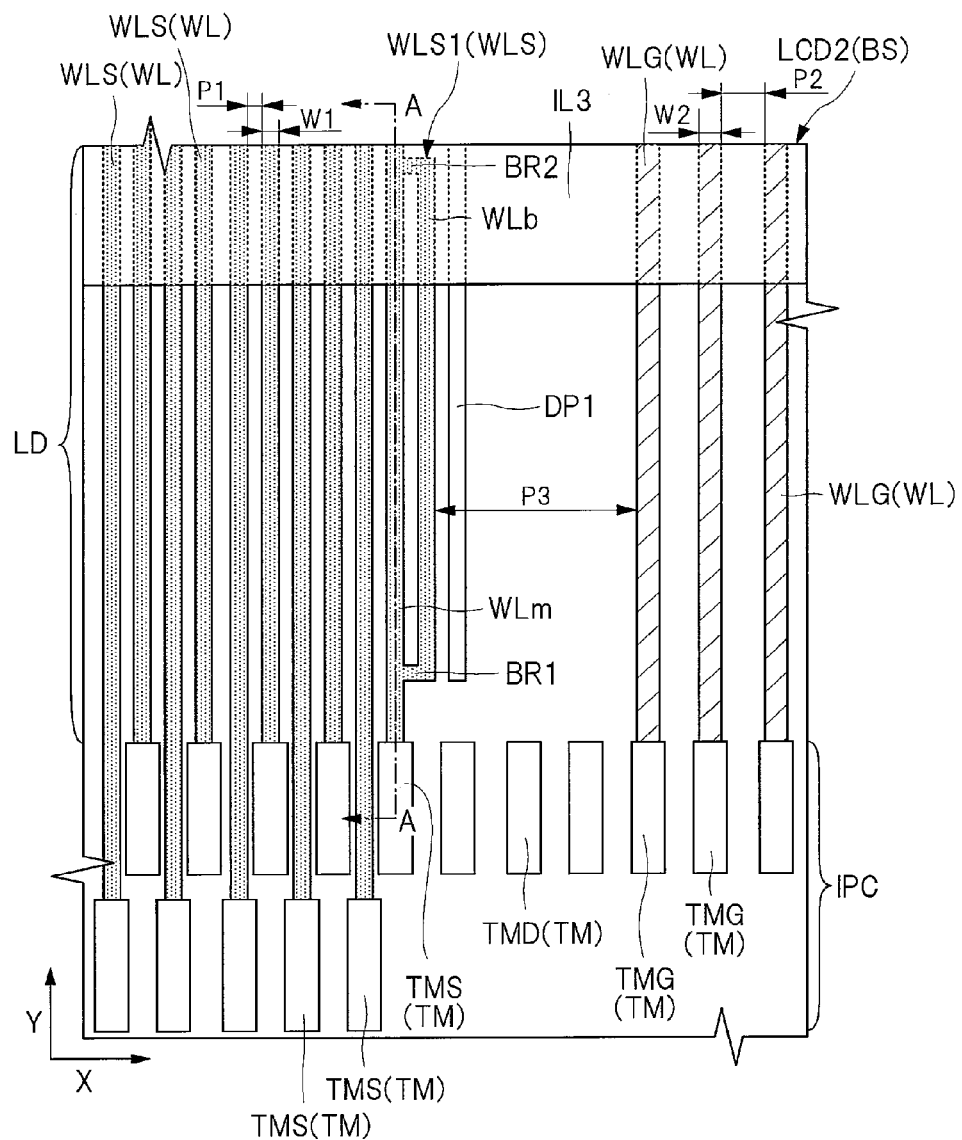
FIG. 8 is an enlarged plan view of a display device which is a modification example with respect to FIG. 5.

However, it has been found out that the ESD is easily generated in a case in which the wiring WL, which is electrically connected to the terminal TM, is not provided in the vicinity of the end-portion wiring WLS1, according to the study of the inventors of the present application. For example, a display device LCD2 illustrated in FIG. 8 includes a floating conductor pattern (dummy pattern) DP1, which is electrically separated from the terminal TM, between the end-portion wiring WLS1 and the wiring WLG. FIG. 8 is an enlarged plan view of a display device which is a modification example with respect to FIG. 5. The ESD is easily generated with respect to the end-portion wiring WLS1, even when the conductor pattern DP1, which is electrically separated from the terminal TM, is provided in the vicinity of the end-portion wiring WLS1, as in the example of the display device LCD2. Accordingly, it is preferable that the end-portion wiring WLS1, which is provided in the end portion of the array, among the plurality of wirings WLS, includes the main line WLm1, the bypass line WLb1, the branch portion BR1, and the branch portion BR2, even in a case of the display device LCD2.

In addition, a plurality of terminals TMD are provided between the terminal TMS, which is connected to the end-portion wiring WLS1, and the terminal TMG, which is provided at a position closest to the terminal TMS among the plurality of terminals TMG, in the example illustrated in FIG. 5. The terminal TMD is a floating conductor pattern (a dummy pattern or a dummy terminal) which is electrically separated from the signal transmission path such as the plurality of wirings WLS or the plurality of wirings WLG. The ESD is easily generated with respect to the end-portion wiring WLS1, even in a case in which the plurality of dummy terminals TMD are provided between the terminal group configured of the plurality of terminals TMS and the terminal group configured of the plurality of terminals TMG in this manner. Accordingly, it is preferable that the end-portion wiring WLS1, which is provided in the end portion of the array, among the plurality of wirings WLS, includes the main line WLm1, the bypass line WLb1, the branch portion BR1, and the branch portion BR2, even in a case of the display device LCD2. Incidentally, the plurality of terminals TMD are not necessarily provided, as a modification example with respect to FIG. 5.

Figure 9:
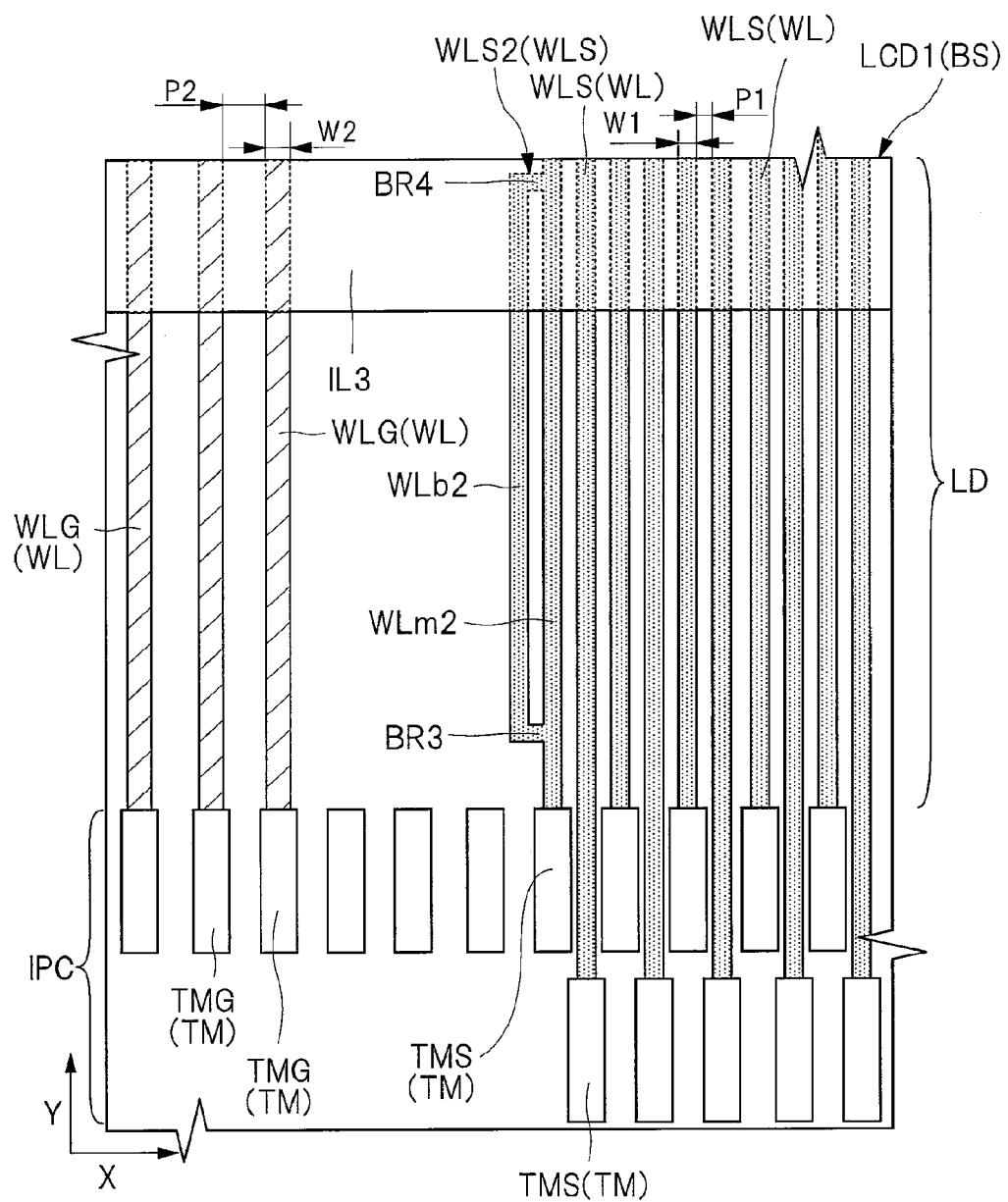
FIG. 9 is an enlarged plan view illustrating a periphery of an end portion of an array on the opposite side of the plurality of wirings illustrated in FIG. 5.

In addition, it is possible to suppress the disconnection of the signal transmission path when the end-portion wiring WLS1, which is provided in at least one end portion, among the plurality of wirings WLS arranged at the interval P1, includes the bypass line WLb1, the branch portion BR1, and the branch portion BR2, as illustrated in FIG. 5. However, it is preferable to take proper measures to both end portions of the plurality of wirings WLS arranged at the interval P1, from a viewpoint to suppress the disconnection with respect to each of the plurality of signal transmission paths. FIG. 9 is an enlarged plan view illustrating a periphery of the end portion of the array on the opposite side of the plurality of wirings, illustrated in FIG. 5.

As illustrated in FIG. 9, the plurality of wirings WLS included in the display device LCD1 include the end-portion wiring WLS1 (see FIG. 5) provided in one end portion of the array, and an end-portion wiring WLS2 formed in an end portion of the array on the opposite side of the end-portion wiring WLS1. In addition, the end-portion wiring WLS2 includes a main line WLm2, which extends along the extending direction of the neighboring wiring WLS, a bypass line WLb2 which extends along the main line WLm2, and branch portions BR3 and BR4 which connect the main line WLm2 and the bypass line WLb2 to each other, as similar to the end-portion wiring WLS1 illustrated in FIG. 5. In other words, the plurality of wirings WLS, included in the display device LCD1 of the present embodiment, include the end-portion wirings WLS1 and WLS2 provided with the main lines WLm1 and WLm2, the bypass lines WLb1 and WLb2, the branch portions BR1 and BR3, and the branch portions BR2 and BR4 at both ends of the array. Accordingly, even in a case in which any one of the bypass line WLb2 and the main line WLm2 is damaged when the ESD is generated with respect to the end-portion wiring WLS2, the other one is hardly damaged, and thus, it is possible to suppress the disconnection of the signal transmission path formed by the end-portion wiring WLS2.

Figure 10:
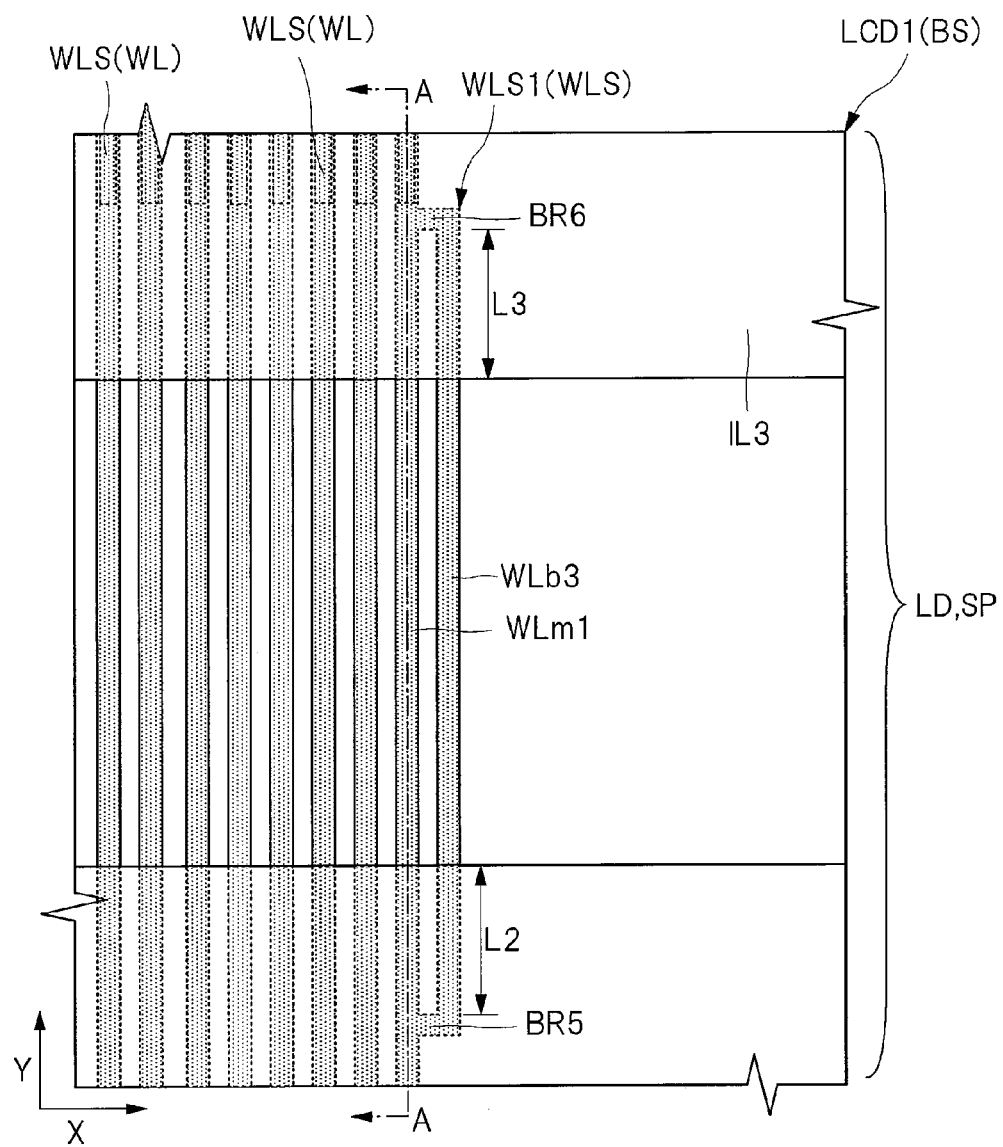
FIG. 10 is an enlarged plan view illustrating the layout of the plurality of wirings which are further positioned on a display portion side than an area illustrated in FIG. 5.

In addition, the substrate FS and the substrate BS are attached and fixed to each other by the seal material SPp provided in the seal portion SP, as described with reference to FIG. 4. Since the seal portion SP continuously surrounds the periphery of the display portion DP illustrated in FIG. 1, the seal portion SP illustrated in FIG. 4 is provided also in the area along the side BSs1, in the frame portion FL illustrated in FIG. 1. FIG. 10 is an enlarged plan view illustrating the layout of the plurality of wirings which are further positioned on the display portion side than the area illustrated in FIG. 5. In addition, FIG. 11 is an enlarged cross-sectional view taken along a line A-A of FIG. 10.

Although FIG. 10 is the plan view, the wirings WLS to be connected to the source line SL (see FIG. 1) are attached with patterns, as similar to FIG. 5. In addition, FIG. 10 illustrates a contour of each part of the plurality of wirings WL covered by the organic insulation film IL3 using the dotted line, in order to explicitly illustrate a boundary between each part of the plurality of wirings WL covered by the organic insulation film IL3 and the other part thereof exposed from the organic insulation film IL3. Meanwhile, the part of the wiring WL exposed from the organic insulation film IL3 is covered by the inorganic insulation film IL2, the inorganic insulation film IL4, and the seal material SPp, as illustrated in FIG. 11, and the part exposed from the organic insulation film IL3 is illustrated using the solid line in FIG. 10, in order to explicitly illustrate whether to be exposed from the organic insulation film IL3. In addition, FIG. 11 illustrates positions to which branch portions BR5 and BR6 are connected are illustrated using the two-dot chain lines, in order to explicitly illustrate the positions to which the branch portions BR5 and BR6 illustrated in FIG. 10 are connected.

Figure 11:
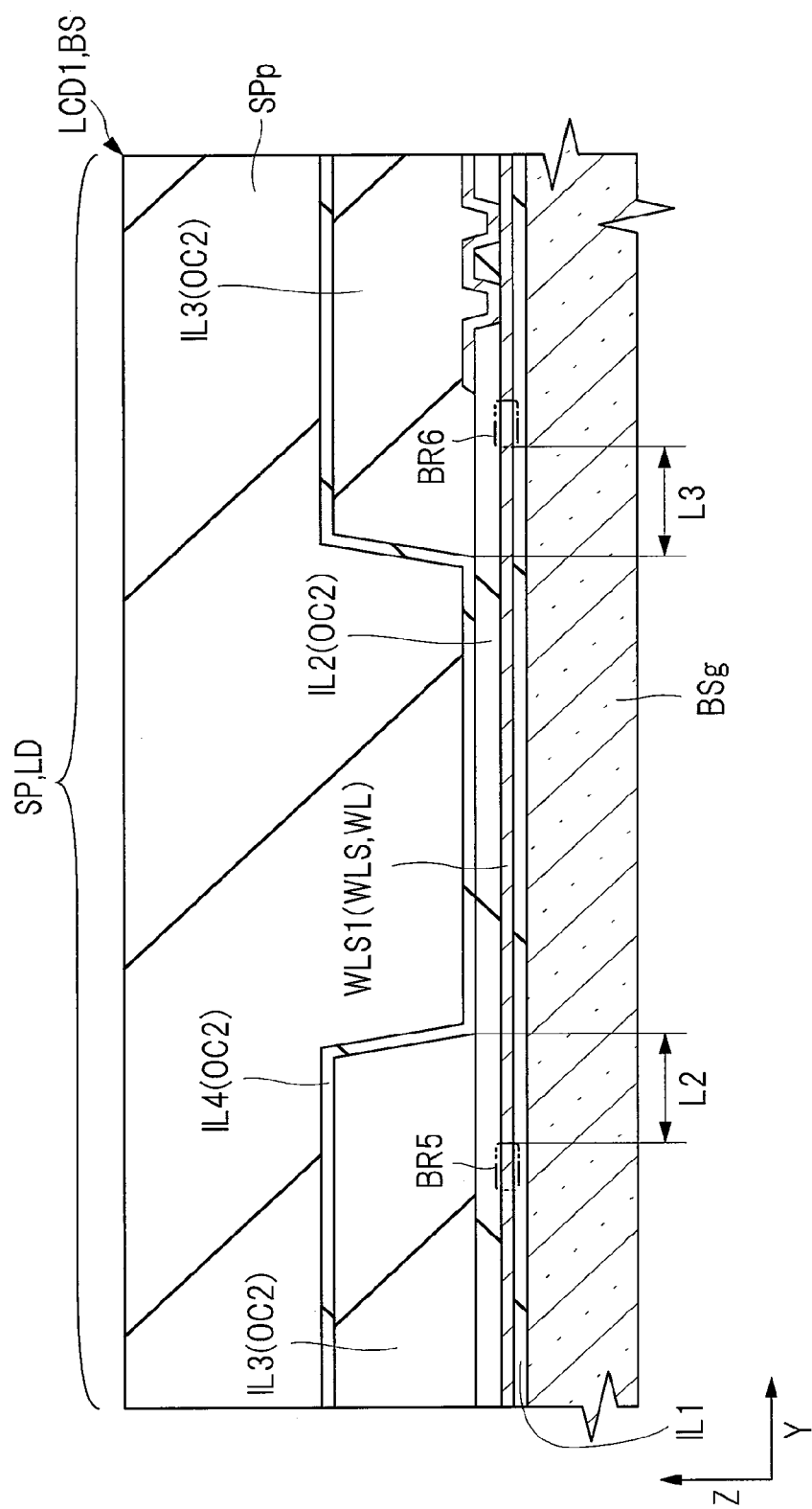
FIG. 11 is an enlarged cross-sectional view taken along a line A-A of FIG. 10.

The seal portion SP is provided in the lead-out wiring portion LD, in an area between the display portion DP (see FIG. 1) and the side BSs1 (see FIG. 1), as illustrated in FIGS. 10 and 11. In addition, the wiring WLS is exposed from the organic insulation film IL3 in a part of an area in which the seal material SPp is arranged, as illustrated in FIG. 11. In other words, the wiring WLS has an opening portion from which the organic insulation film IL3 is removed in a part of the area in which the seal material SPp is arranged.

In this manner, the ESD is not generated after the seal material SPp is embedded in the opening portion, as illustrated in FIG. 11, even in a case in which the wiring WLS has the opening portion from which a part of the organic insulation film IL3 is removed. However, there is a case in which the ESD is generated with respect to the part of the end-portion wiring WLS1, which is exposed from the organic insulation film IL3, after the part of the organic insulation film IL3 is removed and before the seal material SPp is embedded.

Thus, a bypass line WLb3, different from the bypass line WLb1 illustrated in FIG. 5, is provided in a part, which overlaps with the seal portion SP and is exposed from the organic insulation film IL3, of the end-portion wiring WLS1 in which the ESD may be generated, as illustrated in FIGS. 10 and 11 of the present embodiment. In detail, the end-portion wiring WLS1 includes the main line WLm1 extending along the Y direction, which is the extending direction of the neighboring wiring WLS, the bypass line WLb3 extending along the main line WLm1, and the branch portion BR5 and the branch portion BR6 which connect the main line WLm1 and the bypass line WLb3 to each other, as illustrated in FIG. 10.

In addition, a part of the end-portion wiring WLS1 is covered by the organic insulation film IL3, and each of the branch portion BR2, the branch portion BR5 and the branch portion BR6, other than the branch portion BR1 provided at a position closest to the terminal TMS illustrated in FIG. 5, is covered by the organic insulation film IL3, among the branch portion BR1 and the branch portion BR2 illustrated in FIG. 5 and the branch portion BR5 and the branch portion BR6 illustrated in FIG. 10.

In addition, each part of the branch portion BR1 illustrated in FIG. 5 and the bypass line WLb3 illustrated in FIG. 10 is exposed from the organic insulation film IL3. In addition, the part of the bypass line WLb3 exposed from the organic insulation film IL3 is covered by the seal material SPp illustrated in FIG. 11. The seal material SPp is an adhesive that continuously surrounds the periphery of the display portion DP illustrated in FIG. 1.

In addition, each part of the main line WLm1 and the bypass line WLb3 (see FIG. 10) is also covered by the organic insulation film IL3, in a case in which the branch portions BR5 and BR6 are covered by the organic insulation film IL3, as illustrated in FIGS. 10 and 11. It is preferable that each of a distance L2 from an end portion of the opening portion from which the organic insulation film IL3 is removed to the branch portion BR5, and a distance L3 from the above-described end portion to the branch portion BR6 be equal to or larger than 10 µm, from a viewpoint to allow the branch portion BR2 to be reliably covered by the organic insulation film IL3, in consideration of a positional accuracy to form the organic insulation film IL3. In addition, it is preferable that each of the distances L2 and L3 be equal to or larger than 100 µm from a viewpoint to prevent the damaged point from developing and reaching the branch portion BR5 or the branch portion BR6, in a case in which the wiring WL is damaged in the vicinity of the boundary between the part covered by the organic insulation film IL3 and the part exposed from the organic insulation film IL3.

Incidentally, there is little concern on the generation of ESD in the seal portion SP illustrated in FIGS. 10 and 11, as compared to the area in the vicinity of the terminal TM which has been described with reference to FIG. 5. Thus, it is also possible to employ a configuration in which the bypass line WLb3 is not provided in the seal portion SP, as a modification example with respect to FIGS. 10 and 11. In addition, any one of or both the branch portion BR5 and the branch portion BR6 may be exposed from the organic insulation film IL3, as another modification example with respect to FIGS. 10 and 11. However, a place which may be damaged is limited to the main line WLm1 or the bypass line WLb3 in FIG. 10, as long as both of the branch portion BR5 and the branch portion BR6 are covered by the organic insulation film IL3, and thus, it is particularly preferable from a viewpoint to prevent the disconnection of the signal transmission path. Accordingly, it is preferable that both of the branch portion BR5 and the branch portion BR6 be covered by the organic insulation film IL3, as illustrated in FIGS. 10 and 11, if there is no particular circumstance in which it is difficult to form the organic insulation film IL3 so as to cover the branch portion BR5 or the branch portion BR6, for example.

Second Embodiment

The description has been given with the embodiment in which the image signal terminal group in which the plurality of terminals TMS to which the image signal is input, among the plurality of terminals TM, are arranged is aggregately arranged in the central area of the input unit IPC extending along the X direction, as illustrated in FIG. 1 in the above-described embodiment. However, there is another case in which routing of the wiring is more efficiently performed in the lead-out wiring portion LD, when the image signal terminal groups are separately provided at a plurality of places depending on dimensions of the display portion.

Figure 12:
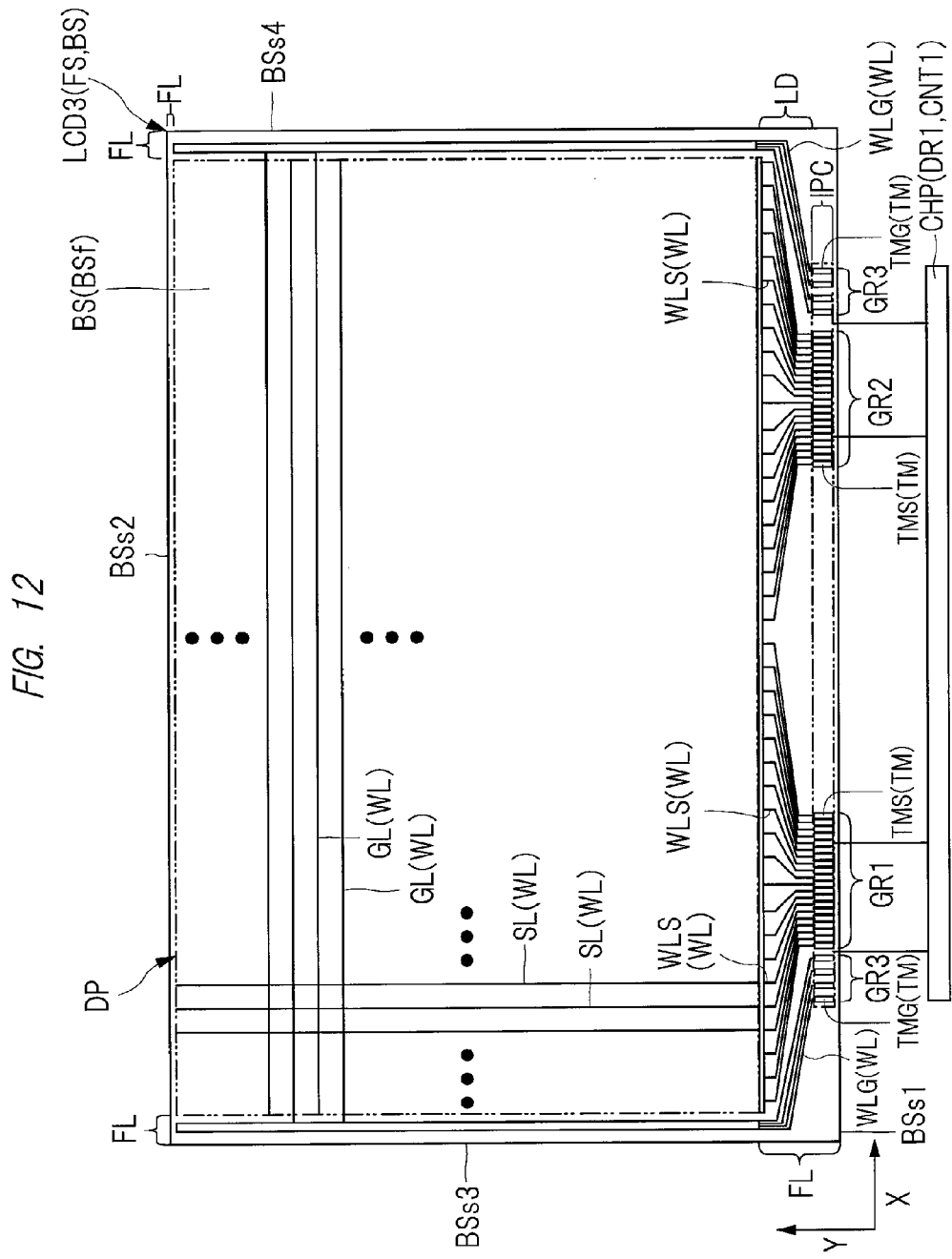
FIG. 12 is a plan view of a display device which is a modification example with respect to FIG. 1.
Figure 13:
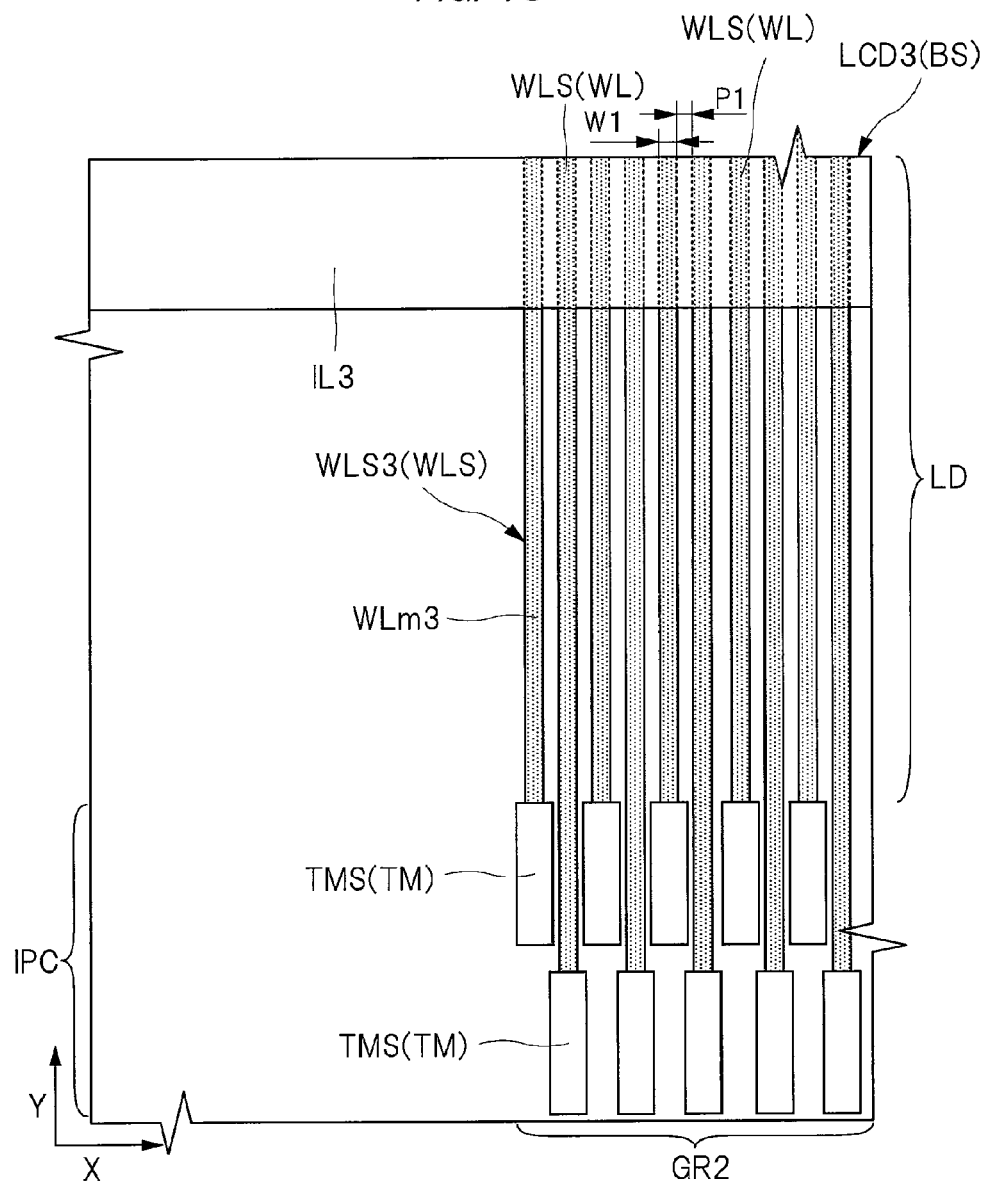
FIG. 13 is an enlarged plan view illustrating a periphery of one end portion of an input unit illustrated in FIG. 12.
Figure 14:
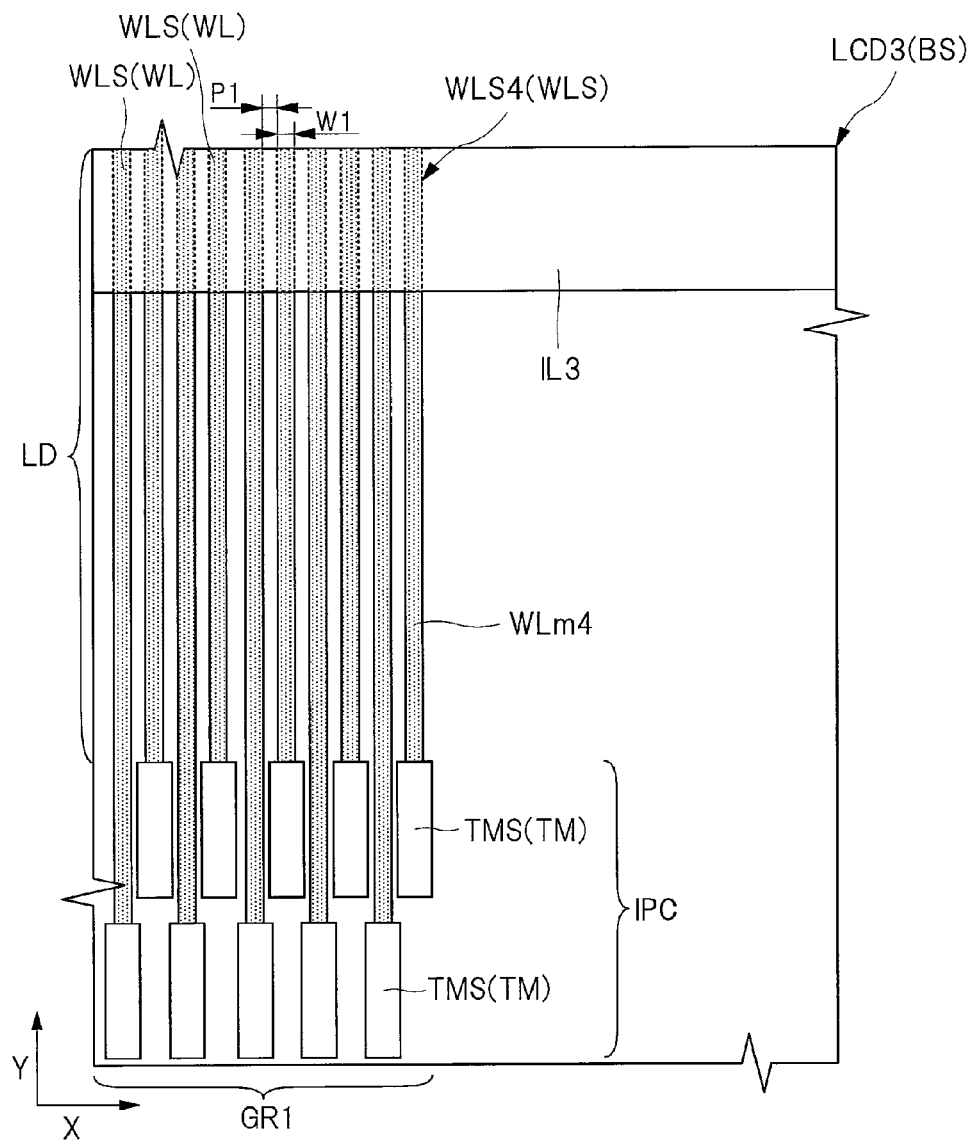
FIG. 14 is an enlarged plan view of the other end portion of the input unit illustrated in FIG. 12.

FIG. 12 is a plan view of a display device which is a modification example with respect to FIG. 1. In addition, FIG. 13 is an enlarged plan view illustrating a periphery of one end portion of an input unit illustrated in FIG. 12. In addition, FIG. 14 is an enlarged plan view of the other end portion of the input unit illustrated in FIG. 12.

Incidentally, a cross-sectional structure of the display device illustrated in FIG. 12 is the same as that of FIG. 2, and thus, is not illustrated. In addition, although FIGS. 13 and 14 are the plan views, the wiring WLS to be connected to the source line SL (see FIG. 1) is attached with a pattern, as similar to FIG. 5. In addition, FIGS. 13 and 14 illustrate a contour of each part of the plurality of wirings WL covered by the organic insulation film IL3 using the dotted line, in order to explicitly illustrate a boundary between each part of the plurality of wirings WL covered by the organic insulation film IL3 and the other part thereof exposed from the organic insulation film IL3. Meanwhile, the part of the wiring WL exposed from the organic insulation film IL3 is covered by the inorganic insulation film IL2 and the inorganic insulation film IL4 illustrated in FIG. 7, and the part exposed from the organic insulation film IL3 is illustrated using the solid line in FIGS. 13 and 14, in order to explicitly illustrate whether to be exposed from the organic insulation film IL3.

A display device LCD3 illustrated in FIG. 12 is different from the display device LCD1 illustrated in FIG. 1 in terms of each planar dimension of the display portion DP and the substrate BS. That is, the substrate BS has a rectangular planar shape of which a length in the X direction is longer than a length in the Y direction orthogonal to the X direction, in the display device LCD3. In other words, each length of the side BSs1 and the side BSs2 of the substrate BS is longer than each length of the side BSs3 and the side BSs4.

In addition, the display device LCD3 is different from the display device LCD1 illustrated in FIG. 1 in that the terminal groups in which the plurality of image signal terminals TMS are arranged are separately provided at two places in the input unit IPC extending in the X direction. In detail, the input unit IPC of the display device LCD3 includes a terminal group GR1 in which the plurality of terminals TMS are arranged, and a terminal group GR2 which is provided to be spaced apart from the terminal group GR1 and in which the plurality of terminals TMS are arranged. In addition, the input unit IPC includes terminal groups GR3 in which the plurality of scan signal terminals TMG are arranged on each outer side of the terminal group GR1 and the terminal group GR2. The terminal group GR1 and the terminal group GR2 are provided between the terminal groups GR3.

The technique that has been described in the first embodiment can be applied in a case of the display device LCD3. That is, the structure, which has been described with reference to FIGS. 5 and 6 in the above-described first embodiment, is provided in a boundary between the terminal group GR2 and the terminal group GR3 illustrated in FIG. 12. In detail, the end-portion wiring WLS1, which is formed in an end portion on a side closer to the terminal group GR3 (see FIG. 12), among the plurality of wirings WLS, includes the main line WLm1, which extends along the extending direction (the Y direction in FIG. 6) of the neighboring wiring WLS, the bypass line WLb1 which extends along the main line WLm1, and the branch portions BR1 and BR2 which connect the main line WLm1 and the bypass line WLb1. Accordingly, it is possible to suppress the disconnection of the signal transmission path, even in a case in which the ESD is generated with respect to the end-portion wiring WLS1, as described in the above-described first embodiment.

In addition, the structure, which has been described with reference to FIG. 9 in the above-described first embodiment, is provided in a boundary between the terminal group GR1 and the terminal group GR3 illustrated in FIG. 12. In detail, the end-portion wiring WLS2, which is formed in an end portion on a side closer to the terminal group GR3 (see FIG. 12), among the plurality of wirings WLS includes the main line WLm2, which extends along the extending direction (the Y direction in FIG. 9) of the neighboring wiring WLS, the bypass line WLb2 which extends along the main line WLm2, and the branch portions BR3 and BR4 which connect the main line WLm2 and the bypass line WLb2 to each other. Accordingly, it is possible to suppress the disconnection of the signal transmission path, even in a case in which the ESD is generated with respect to the end-portion wiring WLS2, as described in the above-described first embodiment.

Incidentally, the part covered by the organic insulation film IL3 and the part exposed from the organic insulation film IL3 are present in each of the end-portion wiring WLS1 and the end-portion wiring WLS2, as described in the above-described first embodiment. This is the same as in the first embodiment described above. In addition, a preferable range or a preferable dimension of the part covered by the organic insulation film IL3 is also the same as in the first embodiment. Further, the same description is applied in a case in which the part, exposed from the organic insulation film IL3, of the seal portion SP is present, as described with reference to FIGS. 10 and 11. Accordingly, the redundant description will be omitted.

Meanwhile, when the image signal terminals are provided by being divided into the plurality of terminal groups, which are spaced apart from each other, like the display device LCD3, there is a case in which the terminal TM other than the terminal TMS, or a conductor pattern connected to the terminal TM, or the like is not formed in the vicinity of an end-portion wiring WLS3, arranged on a side which is the closest to the terminal group GR1 (see FIG. 12), among the plurality of wirings WLS connected to the terminal group GR2, as illustrated in FIG. 13. In addition, there is a case in which the terminal TM other than the terminal TMS, or a conductor pattern connected to the terminal TM, or the like is not formed in the vicinity of an end-portion wiring WLS4, arranged on a side which is the closest to the terminal group GR2 (see FIG. 12), among the plurality of wirings WLS connected to the terminal group GR1, as illustrated in FIG. 14.

In the end-portion wiring WLS3 illustrated in FIG. 13 or the end-portion wiring WLS4 illustrated in FIG. 14, the end-portion wiring WLS3 and the end-portion wiring WLS4 do not include the bypass line WLb1, the branch portion BR1, and the branch portion BR2 illustrated in FIG. 5, and are configured of main lines WLm3 and WLm4 extending along the Y direction, as similar to the other wirings WLS.

However, the bypass line WLb1, the branch portion BR1, and the branch portion BR2, which have been described with reference to FIG. 5, may be provided in the end-portion wiring WLS3 illustrated in FIG. 13, or the end-portion wiring WLS4 illustrated in FIG. 14. In this case, it is possible to suppress the disconnection of the signal transmission path, even in a case in which the ESD is generated with respect to the end-portion wiring WLS3 or the end-portion wiring WLS4.

Incidentally, the embodiment in which the image signal terminal groups are separately provided at the plurality of places has been described by exemplifying the display device LCD3 which has a rectangle planar shape with the length in the X direction longer than the length in the Y direction orthogonal to the X direction, in the present embodiment. However, the image signal terminal groups may be separately provided at a plurality of places, in the display device which has the rectangle planar shape with the length in the X direction shorter than the length in the Y direction orthogonal to the X direction, as described in the above-described first embodiment. In addition, although it is assumed that the terminal group GR1 and the terminal group GR2 are connected to the common semiconductor chip, each semiconductor chip may be mounted to each of the terminal group GR1 and the terminal group GR2. In addition, although the terminal or the wiring is not provided between the terminal group GR1 and the terminal group GR2, a dummy terminal, or a terminal or a wiring to supply a signal or a potential to the display area may be provided.

Third Embodiment

Figure 15:
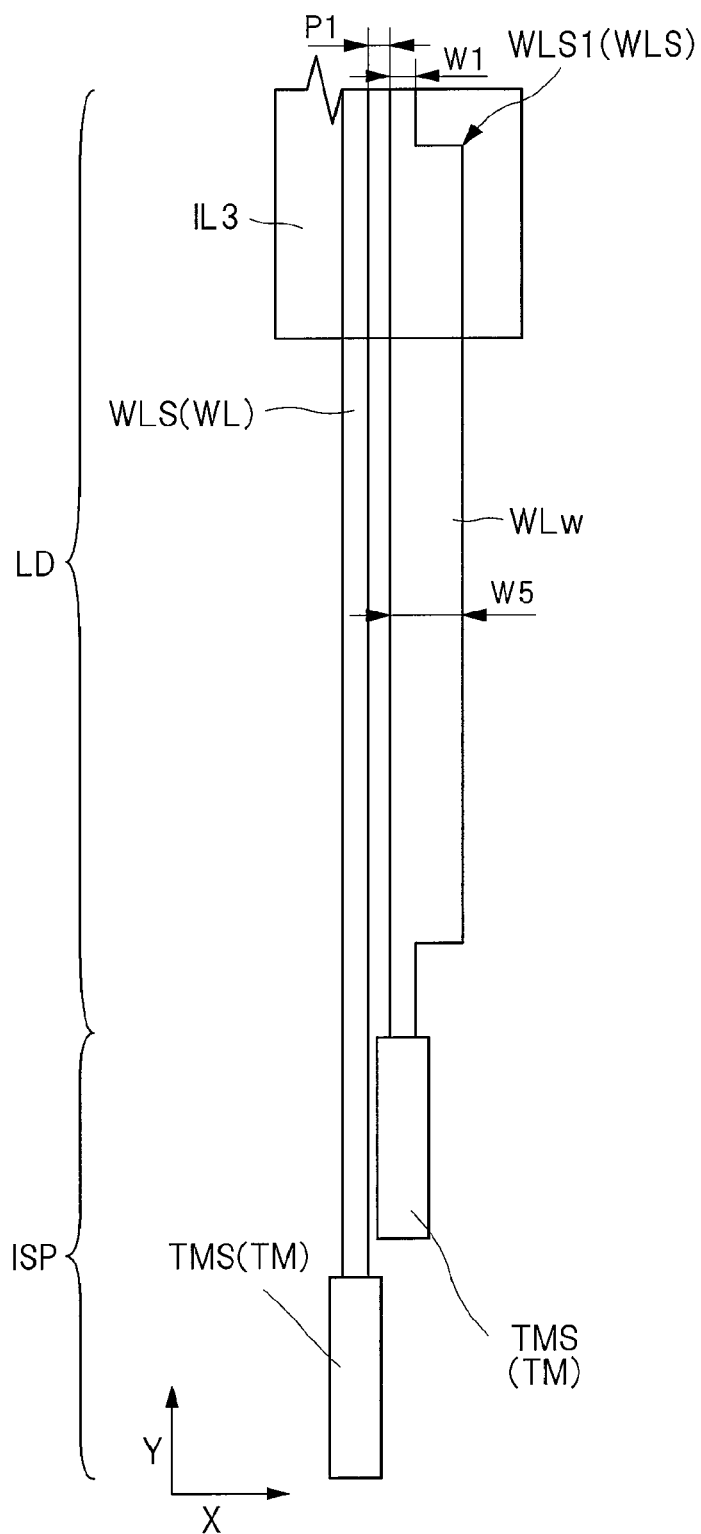
FIG. 15 is an enlarged plan view illustrating a modification example with respect to FIG. 6.
Figure 16:
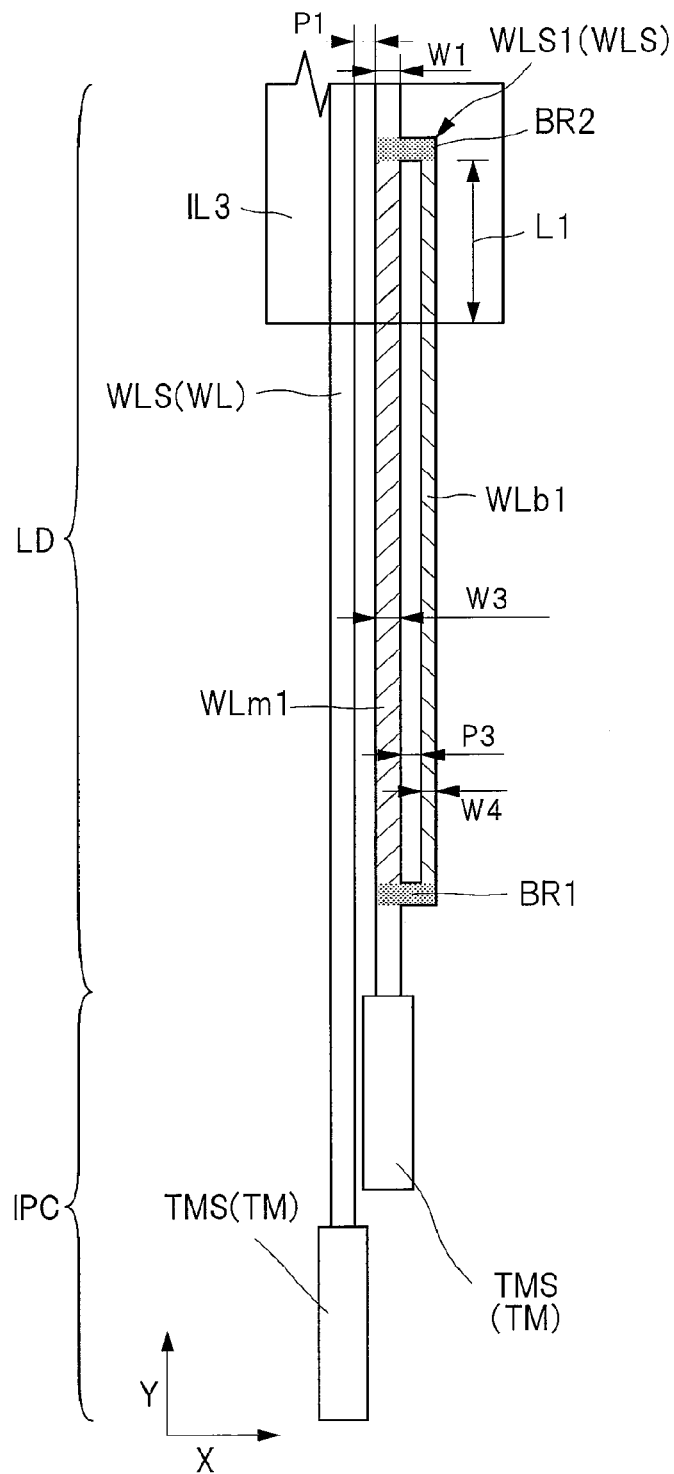
FIG. 16 is an enlarged plan view illustrating another modification example with respect to FIG. 6.

In addition, the inventors of the present application have studied another embodiment which is different from the above-described embodiments, as a method of suppressing the damage of the end-portion wiring WLS1 when the ESD is generated. FIG. 15 is an enlarged plan view illustrating a modification example with respect to FIG. 6. In addition, FIG. 16 is an enlarged plan view illustrating another modification example with respect to FIG. 6.

The end-portion wiring WLS1 illustrated in FIG. 15 is different from the end-portion wiring WLS1 illustrated in FIGS. 5 and 6 in that a wide portion WLw, having a wiring width W5 wider than the wiring width W1 of each of the plurality of wirings WLS, is provided in a part of the wiring path. In a case of the structure illustrated in FIG. 15, it is possible to reduce a degree of the damage caused by the ESD, when the ESD is generated, by providing the wide portion WLw in a part which is likely to be damaged.

However, there is a possibility that the signal transmission path is disconnected depending on a degree of the progress of the damage, although time is required for the progress of the damaged point, in a case in which the damage caused by the ESD is generated in the wide portion WLw. In addition, as illustrated in FIG. 15, when the wiring width W5 that is the part of the wiring path is thicker than the other part thereof, the impedance in the course of the wiring path is locally increased. Accordingly, the wide portion WLw is not necessarily provided from a viewpoint to reduce a signal loss caused by reflection of signal or the like.

On the other hand, it is possible to suppress the increase in impedance, in a case of the scheme, which has been described in the first embodiment or the second embodiment, in which the bypass line is provided, as compared to the embodiment illustrated in FIG. 15 in which the wide portion WLw is provided. In particular, a wiring width W3 of the main line WLm1 and a wiring width W4 of the bypass line WLb1 are equal to the wiring width W1 of the plurality of wirings WLS, in the example illustrated in FIG. 6. Thus, it is possible to suppress the local change of impedance in the signal transmission path, in a case in which any one of the main line WLm1 and the bypass line WLb1 is disconnected. Incidentally, the above-described expression of "the wiring width is equal" means that design dimensions in the wiring design have the same values, and do not exclude a slight dimensional difference within a range of margin which is acceptable on the design, for example, a dimensional tolerance or the like.

In addition, the end-portion wiring WLS1 illustrated in FIG. 16 is different from the end-portion wiring WLS1 illustrated in FIGS. 5 and 6 in that the wiring width W4 of the bypass line WLb1 is thinner than the wiring width W3 of the main line WLm1. When the ESD is generated, the bypass line WLb1 with the relatively narrow width is more easily damaged, and as a result, the main line WLm1 is hardly damaged, in a case of the structure illustrated in FIG. 16. In other words, the main line is likely to remain as the signal transmission path. In addition, since the bypass line WLb1 is easily disconnected in the structure illustrated in FIG. 16, it is possible to suppress the local change of impedance, as compared to the structure illustrated in FIG. 15.

However, if the main line WLm1 is damaged in the structure illustrated in FIG. 16, the signal transmission is performed using the bypass line WLb1 with a relatively thin width. Accordingly, from a viewpoint of the reliability of the signal transmission, it is preferable that the wiring width W3 of the main line WLm1 and the wiring width W4 of the bypass line WLb be equal to the wiring width W1 of the plurality of wirings WLS, as illustrated in FIG. 6.

In addition, it is possible to stably perform patterning when each of the interval P1 and the wiring width W1 of the plurality of wirings WLS is equal to each other, in a case in which photolithography is performed when performing patterning on the plurality of wirings WLS. Thus, it is preferable that each of the wiring width W3 of the main line WLm1 and the wiring width W4 of the bypass line WLb be equal to the wiring width W1 of the plurality of wirings WLS, and the interval P3 between the main line WLm1 and the bypass line WLb1 be equal to the interval P1 among the plurality of wirings WLS, in terms of ease of the patterning of wiring, as illustrated in FIG. 6.

As above, the invention that has been made by the inventors of the present application has been described in detail based on the embodiments and the representative modification examples, but there is still a large variety of modification examples. For example, although the display device using the liquid crystal layer as the display function layer has been disclosed in the above-described embodiments, the invention is not limited thereto. For example, the above-described technique can be applied to a lead-out wiring portion of a so-called organic EL display device which uses a light-emitting element made of an organic compound as the display function layer. In addition, a large variety of the above-described modification examples can be combined to be applied to the embodiments, for example. In addition, although it is configured such that the scan signal, input from the scan signal input terminal, is supplied to the gate line of the display area, it may be configured such that a predetermined potential and a clock signal are input from the scan signal input terminal, a scan signal is generated in a built-in circuit formed on a substrate, and the generated scan signal is supplied to a scanning signal line. In addition, although it is configured such that the image signal, input from the image signal input terminal, is supplied to the source line of the display area, it may be configured such that a circuit such as an RGB switch (selector) is provided between the image signal input terminal and the source line. In addition, the wiring provided with the bypass is not limited to the wiring to which the image signal is supplied, but can be also applied to a wiring to which another signal other than the image signal is supplied, as appropriate.

In the category of the idea of the present invention, a person with ordinary skill in the art can conceive various modification examples and revised examples, and such modification examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention can be utilized for a display device, or an electronic device in which a display device is incorporated.

What is claimed is:

1. A display device comprising:
a display portion;
an input portion; and
lead wirings arranged between the display portion and the input portion to each other,
wherein the input portion includes a plurality of first terminals and a plurality of second terminals,
the lead wirings include a plurality of first lead wirings connected to the plurality of first terminals, and a plurality of second lead wirings connected to the plurality of second terminals,
each of the plurality of first lead wirings has a first width and arranged in a first interval,
each of the plurality of second lead wirings has a second width which is thicker than the first width, and
a first end wiring, which is formed in an end portion of the plurality of first lead wirings, includes a first main line which extends along an extending direction of a neighboring first lead wiring, a first bypass line which extends along the first main line, and a first branch and a second branch which connect the first main line and the first bypass line to each other.

2. The display device according to claim 1,
wherein the plurality of first lead wirings is covered by an organic insulation film, and
the second branch, provided at a position distant from the plurality of first terminals, between the first branch and the second branch of the first end wiring, is covered by the organic insulation film.

3. The display device according to claim 2,
wherein the first branch, provided at a position close to the plurality of first terminals, between the first branch and the second branch of the first end wiring, is exposed from the organic insulation film.

4. The display device according to claim 1, wherein an image signal is input to each of the plurality of first terminals.

5. The display device according to claim 1, wherein the plurality of second lead wirings are provided next to the first end wiring, and an interval, between a second lead wiring provided next to the first end wiring and the first bypass line of the first end wiring among the plurality of second lead wirings, is larger than the first interval.

6. The display device according to claim 1, wherein a second end wiring, formed in an end portion of the opposite side of the first end wiring, among the plurality of first lead wirings, includes a second main line which extends along the extending direction of the neighboring first lead wiring, a second bypass line which extends along the second main line, and a third branch and a fourth branch which connect the second main line and the second bypass line to each other.

7. The display device according to claim 6, wherein the first lead wirings, other than the first end wiring and the second end wiring, among the plurality of first lead wirings, do not include a bypass line.

8. The display device according to claim 1, wherein the first end wiring, formed in the end portion of the plurality of first lead wirings, includes a third bypass line different from the first bypass line, and a third branch and a fourth branch which connect the first main line and the third bypass line to each other.

9. The display device according to claim 8, wherein each part of the plurality of first lead wirings is covered by an organic insulation film, and each of the second branch portion, the third branch, and the fourth branch, other than the first branch provided at a position closest to the plurality of first terminals, among the first branch, the second branch, the third branch and the fourth branch of the first end wiring, is covered by the organic insulation film.

10. The display device according to claim 9, wherein apart of the first branch and the third bypass line of the first end wiring is exposed from the organic insulation film.

11. The display device according to claim 1, wherein a width of the first bypass line and a width of the first main line are equal to each width of the plurality of first lead wirings, and an interval between the first bypass line and the first main line is equal to an interval among the plurality of first lead wirings.

12. A display device comprising:
a substrate provided with a first surface, wherein the first surface includes a display portion, an input unit, and a lead-out wiring portion which connects the display portion and the input unit to each other,
the input unit includes a first terminal group in which a plurality of first terminals are arranged, a second terminal group which is provided to be spaced apart from the first terminal group and in which a plurality of second terminals are arranged, and a plurality of third terminal groups to which a signal different from the first terminal group and the second terminal group is input and in each of which a plurality of third terminals are arranged,
the first terminal group and the second terminal group are provided between the plurality of third terminal groups,
the lead-out wiring portion includes a plurality of first lead-out wirings connected to the plurality of first terminals, and a plurality of second lead-out wirings connected to the plurality of second terminals,
a first end-portion wiring, formed in an end portion of an array on a side distant from the second terminal group, among the plurality of first lead-out wirings, includes a first main line which extends along an extending direction of a neighboring first lead-out wiring, a first bypass line which extends along the first main line, and a first branch portion and a second branch portion which connect the first main line and the first bypass line to each other, and
a second end-portion wiring, formed in an end portion of the array on a side distant from the first terminal group, among the plurality of second lead-out wirings, includes a second main line which extends along an extending direction of a neighboring second lead-out wiring, a second bypass line which extends along the second main line, and a third branch portion and a fourth branch portion which connect the second main line and the second bypass line to each other.

13. The display device according to claim 12, wherein each part of the plurality of first lead-out wirings and the plurality of second lead-out wirings is covered by an organic insulation film,
the second branch portion, provided at a position distant from the plurality of first terminals, between the first branch portion and the second branch portion of the first end-portion wiring, is covered by the organic insulation film, and
the fourth branch portion, provided at a position distant from the plurality of second terminals, between the third branch portion and the fourth branch portion of the second end-portion wiring, is covered by the organic insulation film.

14. The display device according to claim 13, wherein the first branch portion, provided at a position close to the plurality of first terminals, between the first branch portion and the second branch portion of the first end-portion wiring, is exposed from the organic insulation film, and
the third branch portion, provided at a position close to the plurality of second terminals, between the third branch portion and the fourth branch portion of the second end-portion wiring, is exposed from the organic insulation film.

15. The display device according to claim 12, wherein the first terminal group and the second terminal group are provided at an end of the input unit extending along a first direction, and
the first lead-out wirings and the second lead-out wirings, other than the first end-portion wiring and the second end-portion wiring, among the plurality of first lead-out wirings and the plurality of second lead-out wirings, do not include a bypass line.

* * * * *